(12) United States Patent
Hosseini et al.

(10) Patent No.: US 12,457,609 B2
(45) Date of Patent: Oct. 28, 2025

(54) HARQ-ACK MULTIPLEXING ON PUSCH IN UL CA

(71) Applicant: QUALCOMM Incorporated, San Diego, CA (US)

(72) Inventors: Seyedkianoush Hosseini, San Diego, CA (US); Gokul Sridharan, Sunnyvale, CA (US); Yi Huang, San Diego, CA (US); Wei Yang, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

(21) Appl. No.: 17/662,636

(22) Filed: May 9, 2022

(65) Prior Publication Data

US 2022/0361214 A1 Nov. 10, 2022

Related U.S. Application Data

(60) Provisional application No. 63/186,772, filed on May 10, 2021.

(51) Int. Cl.
| | |
|---|---|
| *H04W 72/12* | (2023.01) |
| *H04L 1/18* | (2023.01) |
| *H04L 1/1812* | (2023.01) |
| *H04L 5/00* | (2006.01) |
| *H04W 72/14* | (2009.01) |

(Continued)

(52) U.S. Cl.
CPC ........... *H04W 72/21* (2023.01); *H04L 1/1812* (2013.01); *H04L 5/0055* (2013.01); *H04W 72/23* (2023.01)

(58) Field of Classification Search
CPC .... H04W 72/21; H04W 72/23; H04L 1/1812; H04L 1/1861; H04L 1/1854; H04L 5/0055
USPC .................................................. 370/329–330
See application file for complete search history.

(56) References Cited

U.S. PATENT DOCUMENTS

| | | | |
|---|---|---|---|
| 2018/0310257 A1* | 10/2018 | Papasakellariou | .... H04W 72/23 |
| 2021/0092756 A1* | 3/2021 | Takeda | .................. H04L 5/0044 |
| 2021/0092762 A1* | 3/2021 | Choi | ...................... H04L 1/1664 |

(Continued)

OTHER PUBLICATIONS

Apple Inc: "Discussions on PUSCH UCI Multiplexing without HARQ-ACK PUCCH in Rel-15", 3GPP TSG RAN WG1 #104b-e, R1-2103079, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, 5 Pages, Apr. 7, 2021, XP052177880, p. 3-p. 4.

(Continued)

*Primary Examiner* — Candal Elpenord
(74) *Attorney, Agent, or Firm* — Procopio, Cory, Hargreaves & Savitch

(57) ABSTRACT

To enable HARQ-ACK multiplexing on PUSCH in UL CA, methods, apparatuses, and computer readable medium are provided. An example method includes selecting at least one of a plurality of PUSCHs in which to multiplex one or more UCI bits, one or more of the plurality of PUSCHs being associated with one or more UL grants, the one or more UL grants including one or more UL tDAI values. The example method further includes transmitting, to a network entity, the one or more UCI bits that are multiplexed with the at least one of the plurality of PUSCHs.

30 Claims, 15 Drawing Sheets

(51) Int. Cl.
*H04W 72/21* (2023.01)
*H04W 72/23* (2023.01)

(56) References Cited

U.S. PATENT DOCUMENTS

| | | | | |
|---|---|---|---|---|
| 2021/0360616 | A1* | 11/2021 | Yi | H04L 5/0012 |
| 2022/0094485 | A1* | 3/2022 | Lin | H04L 1/1887 |
| 2022/0132537 | A1* | 4/2022 | Wang | H04L 5/0053 |
| 2022/0330234 | A1* | 10/2022 | Yang | H04W 72/56 |
| 2023/0078723 | A1* | 3/2023 | Kim | H04L 25/0226 |
| | | | | 370/329 |
| 2023/0209530 | A1* | 6/2023 | Rastegardoost | H04L 1/1854 |
| | | | | 370/329 |

OTHER PUBLICATIONS

International Search Report and Written Opinion—PCT/US2022/028586—ISA/EPO—Aug. 19, 2022.

* cited by examiner

HARQ-ACK MULTIPLEXING ON PUSCH IN UL CA

CROSS REFERENCE TO RELATED APPLICATION(S)

This application claims the benefit of and priority to U.S. Provisional Application Ser. No. 63/186,772, entitled "HARQ-ACK MULTIPLEXING ON PUSCH IN UL CA" and filed on May 10, 2021, which is expressly incorporated by reference herein in its entirety.

TECHNICAL FIELD

The present disclosure relates generally to communication systems, and more particularly, to wireless communication systems with hybrid automatic repeat request (HARQ) acknowledgment (ACK) multiplexing on physical uplink shared channel (PUSCH).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to select at least one of a plurality of PUSCHs in which to multiplex one or more uplink control information (UCI) bits, one or more of the plurality of PUSCHs being associated with one or more uplink (UL) grants, the one or more UL grants including one or more UL total downlink assignment index (tDAI) values. The memory and the at least one processor coupled to the memory may be further configured to transmit, to a network entity, the one or more UCI bits that are multiplexed with the at least one of the plurality of PUSCHs.

In another aspect of the disclosure, a method, a computer-readable medium, and an apparatus at a network entity are provided. The apparatus may include a memory and at least one processor coupled to the memory. The memory and the at least one processor coupled to the memory may be configured to transmit, to a UE, at least one of one or more downlink (DL) grants or one or more UL grants, the one or more UL grants including one or more UL tDAI values. The memory and the at least one processor coupled to the memory may be further configured to receive, from the UE, one or more UCI bits that are multiplexed with at least one of a plurality of PUSCHs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
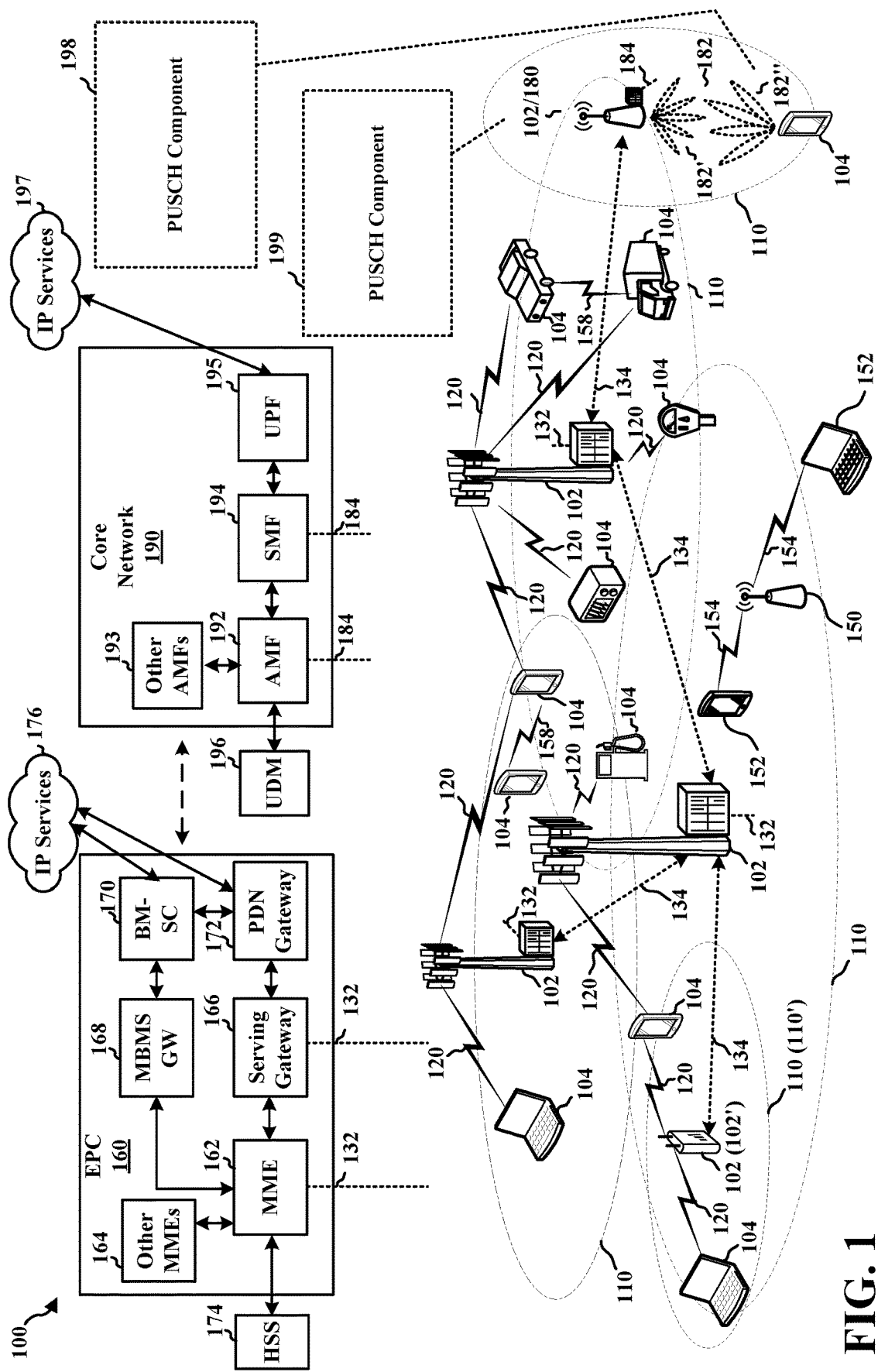
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. In some scenarios, the term UE may also apply to one or more companion devices such as in a device constellation arrangement. One or more of these devices may collectively access the network and/or individually access the network. A network node can be implemented as a base station (i.e., an aggregated base station), as a disaggregated base station, an integrated access and backhaul (IAB) node, a relay node, a sidelink node, etc. A network entity can be implemented as a base station (i.e., an aggregated base station), or alternatively, as a central unit (CU), a distributed unit (DU), a radio unit (RU), a Near-Real Time (Near-RT) RAN Intelligent Controller (RIC), or a Non-Real Time (Non-RT) RIC in a disaggregated base station architecture.

Referring again to FIG. 1, in some aspects, the UE 104 may include a PUSCH component 198. In some aspects, the PUSCH component 198 may be configured to select at least one of a plurality of PUSCHs in which to multiplex one or more UCI bits, one or more of the plurality of PUSCHs being associated with one or more UL grants, the one or more UL grants including one or more UL tDAI values. In some aspects, the PUSCH component 198 may be further configured to transmit, to a base station, the one or more UCI bits that are multiplexed with the at least one of the plurality of PUSCHs.

In certain aspects, the base station 180 may include a PUSCH component 199. In some aspects, the PUSCH component 199 may be configured to transmit, to a UE, at least one of one or more DL grants or one or more UL grants, the one or more UL grants including one or more UL tDAI values. In some aspects, the PUSCH component 199 may be further configured to receive, from the UE, one or more UCI bits that are multiplexed with at least one of a plurality of PUSCHs.

Although the following description may be focused on 5G NR, the concepts described herein may be applicable to other similar areas, such as LTE, LTE-A, CDMA, GSM, and other wireless technologies.

Figure 2:
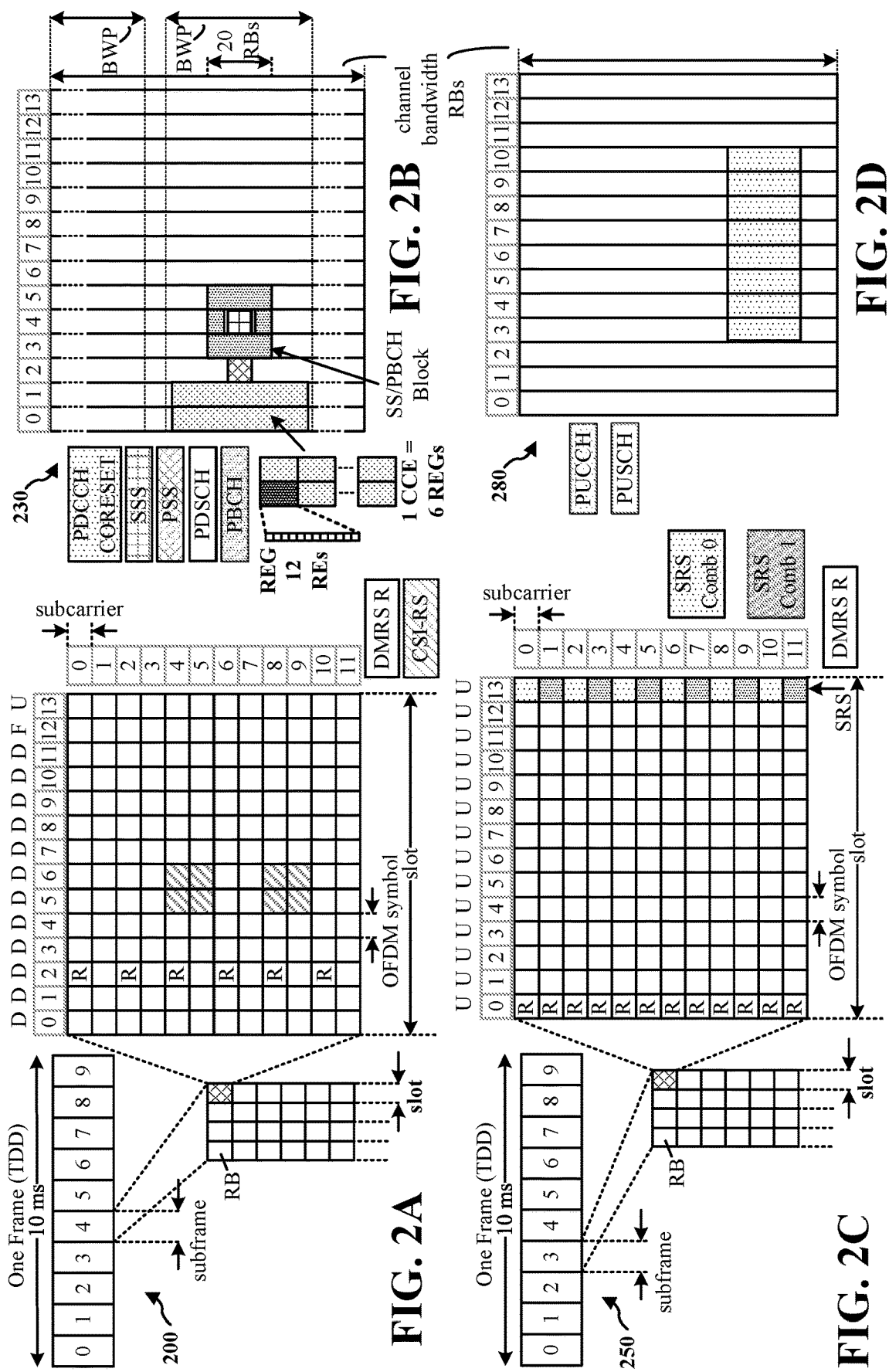
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
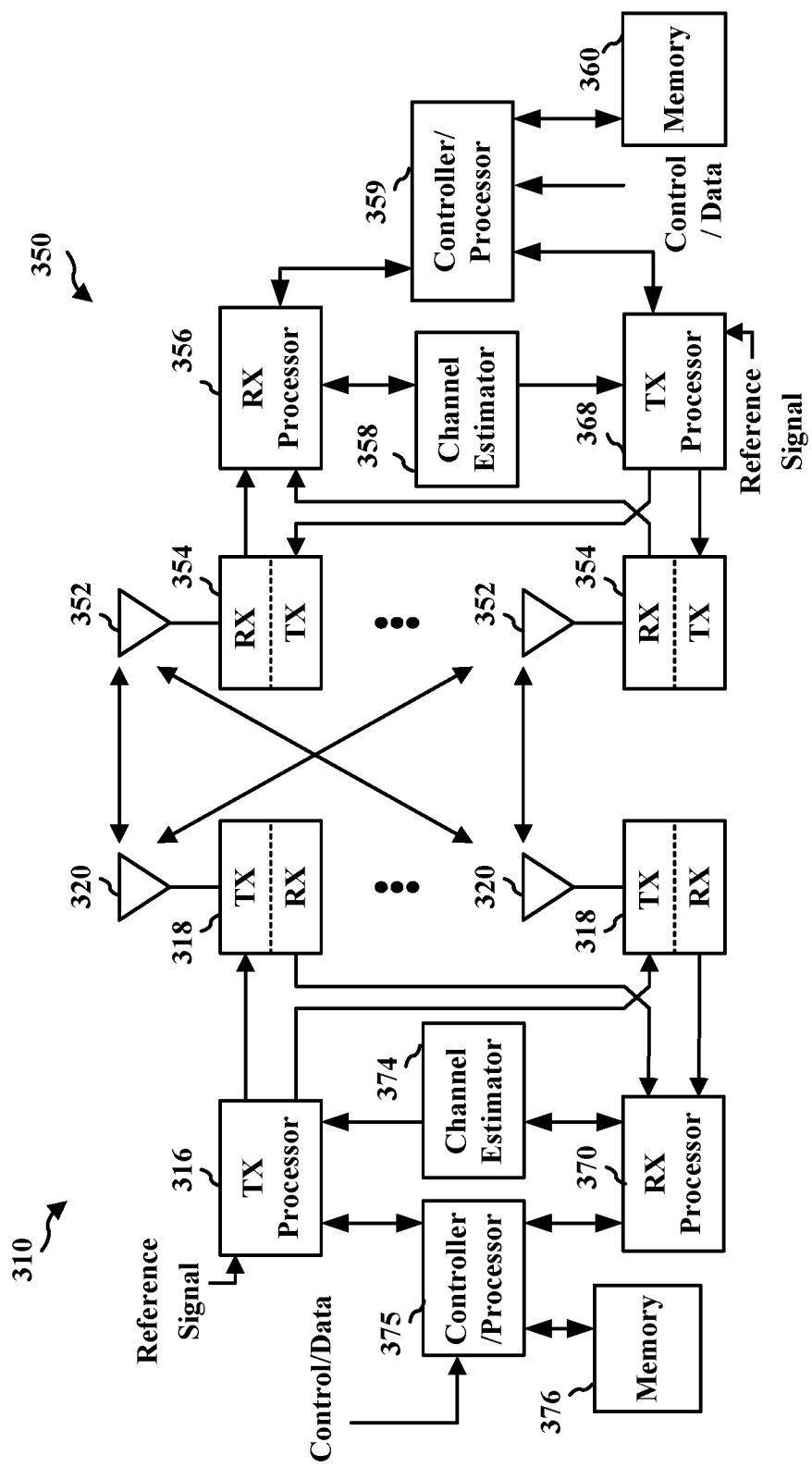
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PUSCH component 198 of FIG. 1.

At least one of the TX processor 316, the RX processor 370, and the controller/processor 375 may be configured to perform aspects in connection with the PUSCH component 199 of FIG. 1.

Example aspects provided herein provide HARQ-ACK multiplexing on PUSCHs. In some wireless communication systems, PUSCH selection based on grant type and CC index may be restricted within one PUSCH slot. When the SCS of a PUSCH is larger than the SCS of a PUCCH, there may be multiple PUSCHs in different slots that overlap with one PUCCH. As illustrated in example 400 of FIG. 4, a PUSCH 414A on CC1 may not be overlapping with a PUCCH 412 while a PUSCH 414B, a PUSCH 414C, and a PUSCH 414D may be overlapping with the PUCCH 412. In one example, the PUSCH 414B, the PUSCH 414C, and the PUSCH 414D may be associated with different grant types, such as a configured grant or a dynamic grant. The PUSCH 414A, the PUSCH 414B, the PUSCH 414C, and the PUSCH 414D may be on different component carriers (CCs) or a same CC. For example, the PUCCH 412 may be on CC0, the PUSCH 414A may be on CC1, the PUSCH 414B may be on CC2, the PUSCH 414C may be on CC3, and the PUSCH 414D may be on CC4. The PUSCH 414A, the PUSCH 414B, the PUSCH 414C, and the PUSCH 414D may be associated with a same PUCCH group, e.g., the PUCCH group associated with the PUCCH 412.

For UCI multiplexing, within a PUCCH group, on PUSCH, UCI in overlapped PUCCH transmissions may be multiplexed into one PUCCH resource (which may be referred to as resource Z). The multiplexing may be performed per PUCCH slot. If the PUCCH resource (resource Z) overlaps with at least one PUSCH, for UCI in resource Z that does not include scheduling request (SR), the UCIs that do not include SR may be multiplexed into one PUSCH following a set of priority rules. For example, for HARQ-ACK bits in the PUCCH 412 which overlaps with the PUSCH 414B, the PUSCH 414C, and the PUSCH 414D, the HARQ-ACK bits may be multiplexed into one PUSCH following a set of priority rules. The PUSCH 414B, the PUSCH 414C, and the PUSCH 414D that overlaps with the PUCCH 412 may be collectively referred to as "a set of overlapping PUSCHs." An example set of priority rules may define that a first priority, which may be the highest priority, is associated with a PUSCH with aperiodic CSI (A-CSI) (as long as it overlaps with Z).

The example set of priority rules may further define that a second priority, which may be the second highest priority, is associated with the earliest (in time) PUSCH slot(s) based on the start of the slots. If there are multiple earliest PUSCH slots that overlap with the PUCCH resource (resource Z), the example set of priority rules may further define that a third priority, which may be the third highest priority, is associated with dynamic grant PUSCHs. In other words, dynamic grant PUSCHs may have a higher priority than configured grant PUSCHs or semi persistent PUSCHs. The example set of priority rules may further define that a fourth priority, which may be the fourth highest priority, may be associated with PUSCHs on a serving cell with a smaller serving cell index. In other words, PUSCHs on a serving cell with a smaller serving cell index may have a higher priority than PUSCHs on a serving cell with a larger serving cell index. The example set of priority rules may further define that a fifth priority, which may be the fifth highest priority, may be associated with earlier PUSCHs. In other words, earlier PUSCHs may have a higher priority than later PUSCHs. For example, the PUSCH 414B may have a higher priority than the PUSCH 414D.

Figure 5:
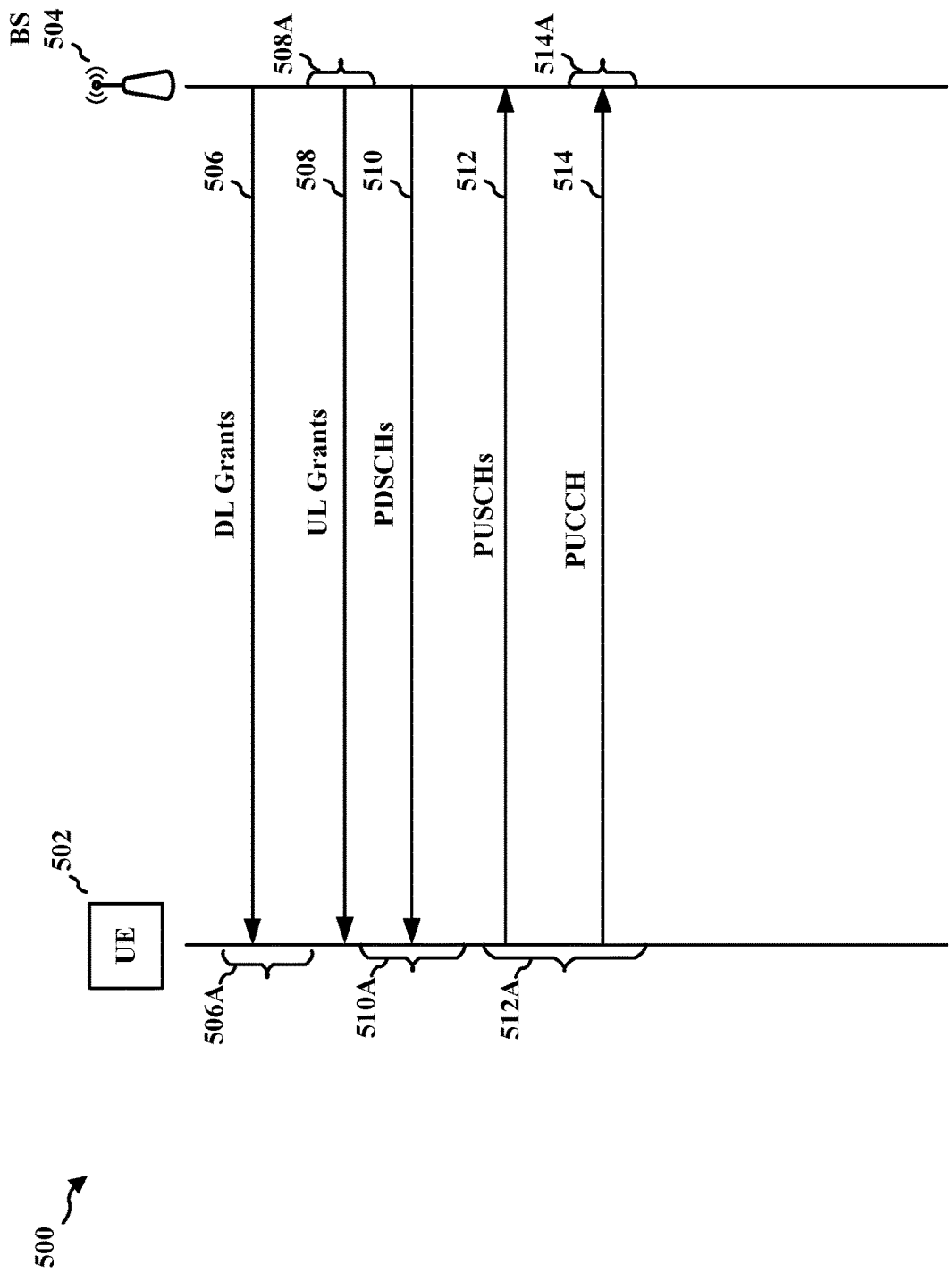
FIG. 5 is a diagram illustrating communications between a UE and a base station.
Figure 6:
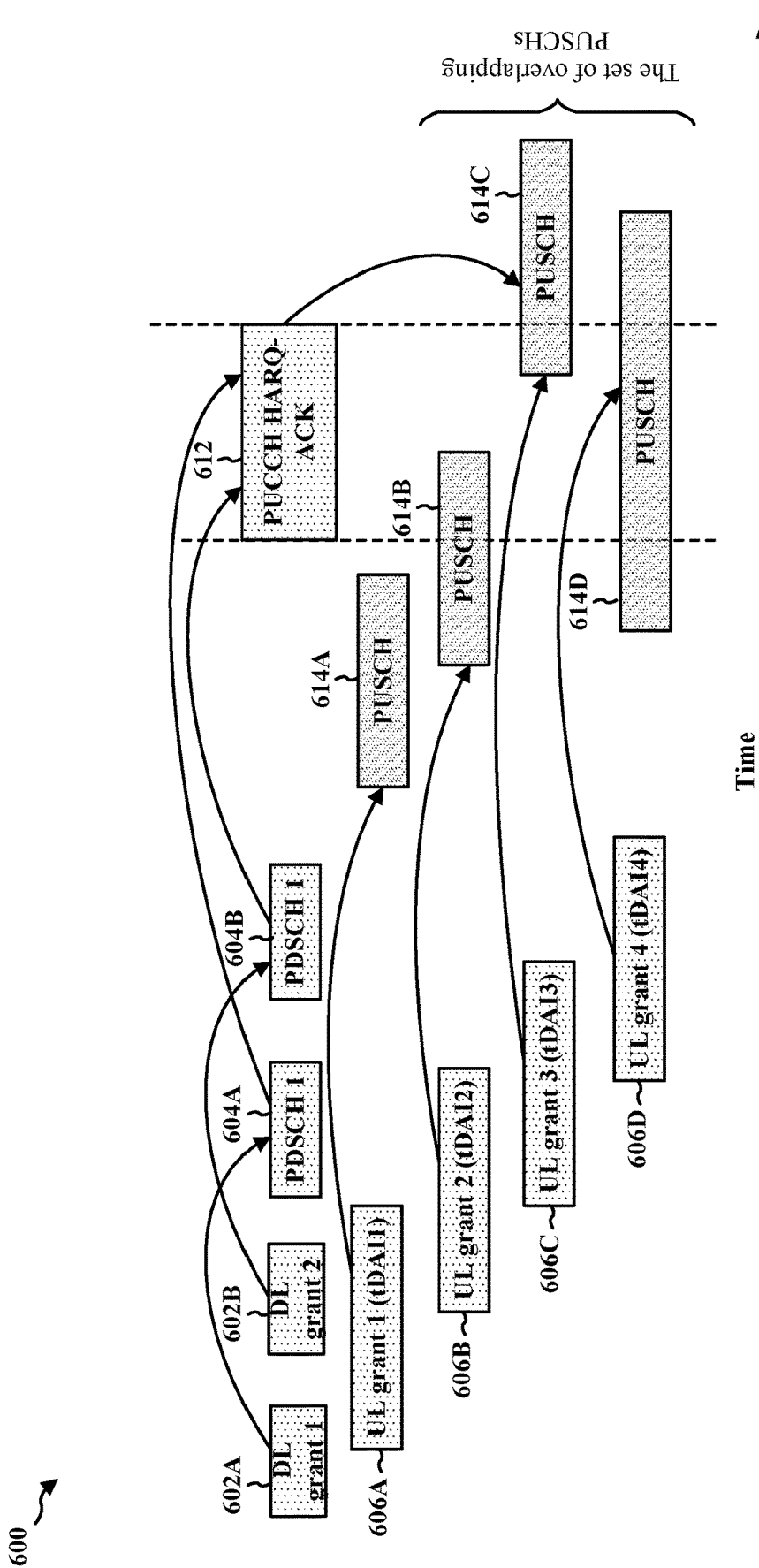
FIG. 6 is a diagram illustrating communications between a UE and a base station.

FIG. 5 illustrates an example communication flow 500 between a UE 502 and a base station 504. As illustrated in FIG. 5, the base station 504 may be a network entity. The network entity may be a network node. The base station 504 may be implemented as an aggregated base station, as a disaggregated base station, an integrated access and backhaul (IAB) node, a relay node, a sidelink node, or the like. A network entity can be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC.

As illustrated in FIG. 5, the base station 504 may transmit one or more DL grants 506 to the UE 502. For example, the one or more DL grants 506 may include a first DL grant and a second DL grant as further illustrated in FIGS. 6-10. The one or more DL grants 506 may be transmitted using time domain resources in the timeframe 506A. In some aspects, the base station 504 may attempt to transmit the one or more DL grants but the UE 502 may fail to receive one or more DL grants in the one or more DL grants 506.

The base station 504 may further transmit one or more UL grants 508 to the UE 502. For example, the one or more UL grants 508 may include a first UL grant associated with a first TDAI value, a second UL grant associated with a second TDAI value, a third UL grant associated with a third TDAI value, and a fourth UL grant associated with a fourth TDAI value, as further illustrated in FIGS. 6-10. The one or more UL grants 508 may be transmitted using time domain resources in the timeframe 508A. In some aspects, the base station 504 may attempt to transmit the one or more UL grants but the UE 502 may fail to receive one or more UL grants in the one or more UL grants 508.

The one or more DL grants 506 may schedule one or more PDSCHs 510. For example, a first DL grant may schedule a first PDSCH and the second DL grant may schedule a second PDSCH, as further illustrated in FIGS. 6-10. The base station 504 may accordingly transmit the one or more PDSCHs 510 to the UE 502. The one or more PDSCHs 510 may be transmitted using time domain resources in the timeframe 510A. In some aspects, the base station 504 may attempt to transmit the one or more PDSCHs but the UE 502 may fail to receive one or more PDSCHs in the one or more PDSCHs 510.

The one or more UL grants may schedule one or more PUSCHs 512. For example, the first UL grant may schedule a first PUSCH, the second UL grant may schedule a second PUSCH, the third UL grant may schedule a third PUSCH, and the first UL grant may schedule a first PUSCH, as further illustrated in FIGS. 6-10. The base station 504 may accordingly transmit the one or more PUSCHs 512 to the UE 502. The one or more PUSCHs 512 may be transmitted using time domain resources in the timeframe 512A, which may be overlapping in time with a PUCCH 514 (i.e., the time domain resources in the timeframe 514A transmitting the PUCCH 514). The one or more PUSCHs 512 may be associated with a same PUCCH group that includes the PUCCH 514.

In some wireless communication systems, after the host PUSCH (i.e., the PUSCH on which PUCCH HARQ-ACK is multiplexed based on the set of priority rules) is determined, the UE 502 may follow the tDAI indicated in the downlink control information (DCI) scheduling the PUSCH and multiplex a number of bits indicated by the tDAI. For example, as illustrated in example 600 of FIG. 6, the UE 502 may receive a first DL grant 602A and a second DL grant 602B, the first DL grant 602A may schedule a first PDSCH 604A and the second DL grant may schedule a second PDSCH 604B. The first PDSCH 604A may be associated with a portion of a PUCCH 712 and the second PDSCH 604B may be associated with another portion of the PUCCH 712. The UE 502 may further receive a first UL grant 606A associated with a first tDAI, a second UL grant 606B associated with a second tDAI, a third UL grant 606C associated with a third tDAI, and a fourth UL grant 606D associated with a first tDAI. The first UL grant 606A may schedule a first PUSCH 614A, the second UL grant 606B may schedule a second PUSCH 614B, the third UL grant 606C may schedule a third PUSCH 614C, and the fourth UL grant 606D may schedule a fourth PUSCH 614D. The second PUSCH 614B, the third PUSCH 614C, and the fourth PUSCH 614D may overlap with a PUCCH 612. The first PUSCH 614A, the second PUSCH 614B, the third PUSCH 614C, the fourth PUSCH 614D, and the PUCCH 612 may be on different CCs or a same CC. For example, the PUCCH 612 may be on CC0, the PUSCH 614A may be on CC1, the PUSCH 614B may be on CC2, the PUSCH 614C may be on CC3, and the PUSCH 614D may be on CC4.

Because the first PUSCH 614A is non-overlapping with the PUCCH 612, the first PUSCH 614A may be excluded from the UCI multiplexing procedure. The second PUSCH 614B, the third PUSCH 614C, and the fourth PUSCH 614D may be determined by the UE 502 to be the set of overlapping PUSCHs. In one example based on the priority rules described in connection with FIG. 4, HARQ-ACK may be multiplexed on the PUSCH 614B on CC2 and the number of HARQ-ACK bits may follow the second tDAI associated with the second UL grant 606B. In other words, the PUSCH 614B may be the host PUSCH (i.e., the PUSCH on which PUCCH HARQ-ACK is multiplexed) selected by the UE 502.

Figure 4:
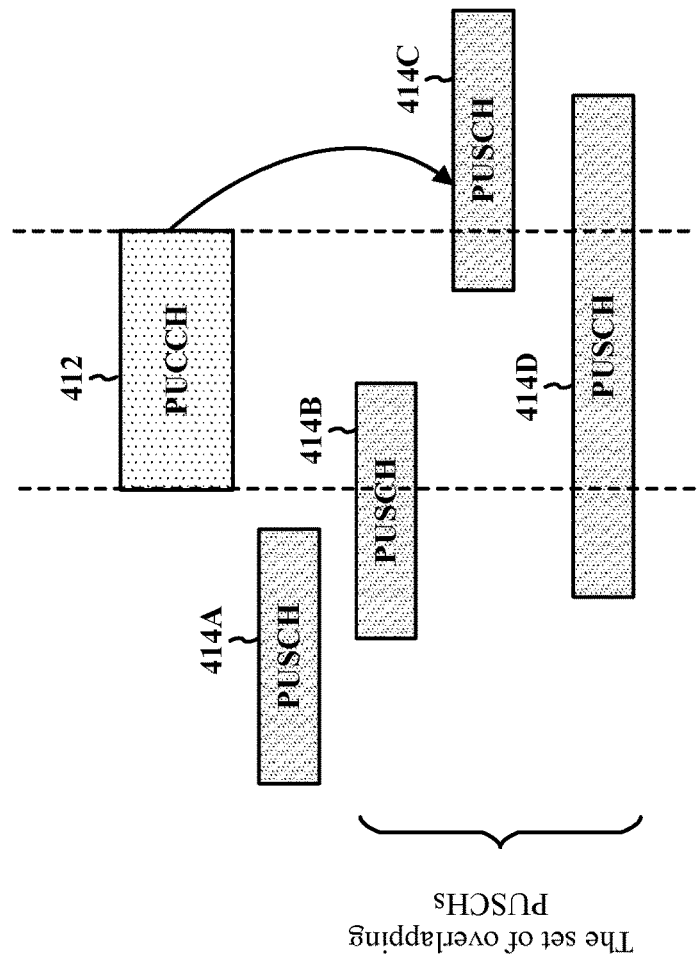
FIG. 4 is a diagram illustrating communications between a UE and a base station.
Figure 7:
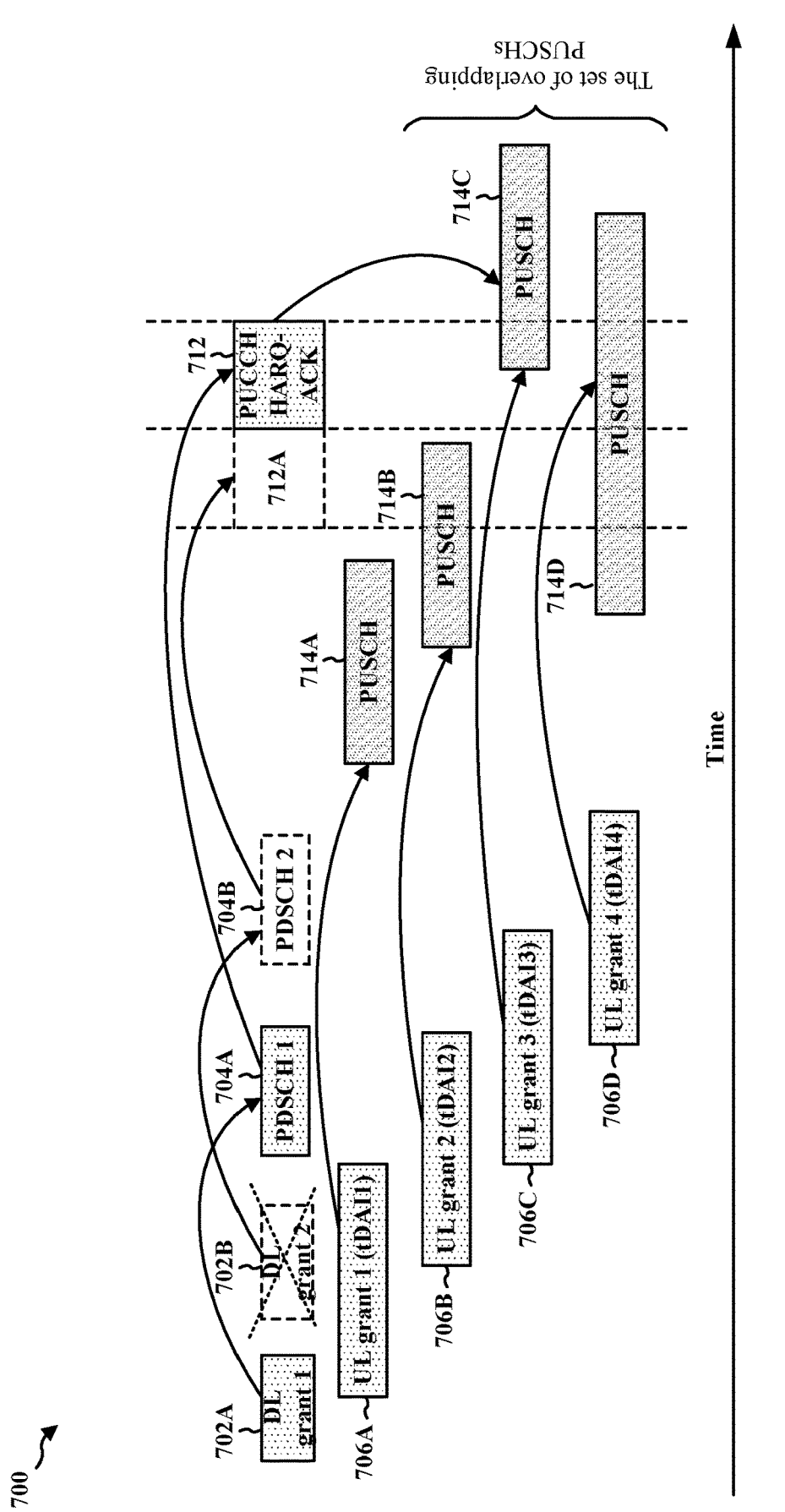
FIG. 7 is a diagram illustrating communications between a UE and a base station.

Based on the priority rules described in connection with FIG. 4, in order to select the host PUSCH (i.e., the PUSCH on which PUCCH HARQ-ACK is multiplexed), the UE 502 may determine the set of PUSCHs that overlap with the PUCCH. However, if one DL grant is missing in transmission, the base station 504 and the UE 502 may have a different understanding regarding the set of PUSCHs. For instance, example 700 of FIG. 7 may include a first DL grant 702A, a second DL grant 702B, a first PDSCH 704A scheduled by the first DL grant 702A, a second PDSCH 704B scheduled by the second DL grant 702B, a first UL grant 706A associated with a first tDAI, a second UL grant 706B associated with a second tDAI, a third UL grant 706C associated with a third tDAI, a fourth UL grant 706D associated with a fourth tDAI, a first PUSCH 714A scheduled by the first UL grant 706A, a second PUSCH 714B scheduled by the second UL grant 706B, a third PUSCH 714C scheduled by the third UL grant 706C, a fourth PUSCH 714D scheduled by the third UL grant 706D, and a PUCCH 712 associated with the first PDSCH 704A and the second PDSCH 704B. As illustrated in FIG. 7, the second DL grant 702B may be missing (i.e., not successfully received by the UE 502), which may cause the second PDSCH 704B to be not successfully scheduled for the UE 502. Based on the procedure illustrated in FIG. 6, the base station 504 may expect the UE 502 to multiplex the HARQ-ACK in the PUCCH 712 on the second PUSCH 714B and the number of bits in the HARQ-ACK may be based on the second tDAI. However, because the second PDSCH 704B was not successfully scheduled for the UE 502, the UE 502 may not be aware of the portion 712A of the PUCCH 712 that are associated with the second PDSCH 704B. Accordingly, the UE 502 may exclude the PUSCH 714B from the multiplexing procedure because the UE 502 may view the PUSCH 714B as non-overlapping with the PUCCH 712. The third PUSCH 714C and the fourth PUSCH 714D may be determined by the UE 502 to be the set of overlapping PUSCHs and the PUSCH 714B may be excluded by the UE 502 from the set of overlapping PUSCHs. The UE 502 may then multiplex the HARQ-ACK in the PUCCH 712 on the third PUSCH 714C and the number of bits in the HARQ-ACK may be based on the third tDAI, thus causing a difference between the expectation of the base station 504 and the actual performance of the UE 502. In turn, this may cause issues for the communications between the base station 504 and the UE 502.

Figure 8:
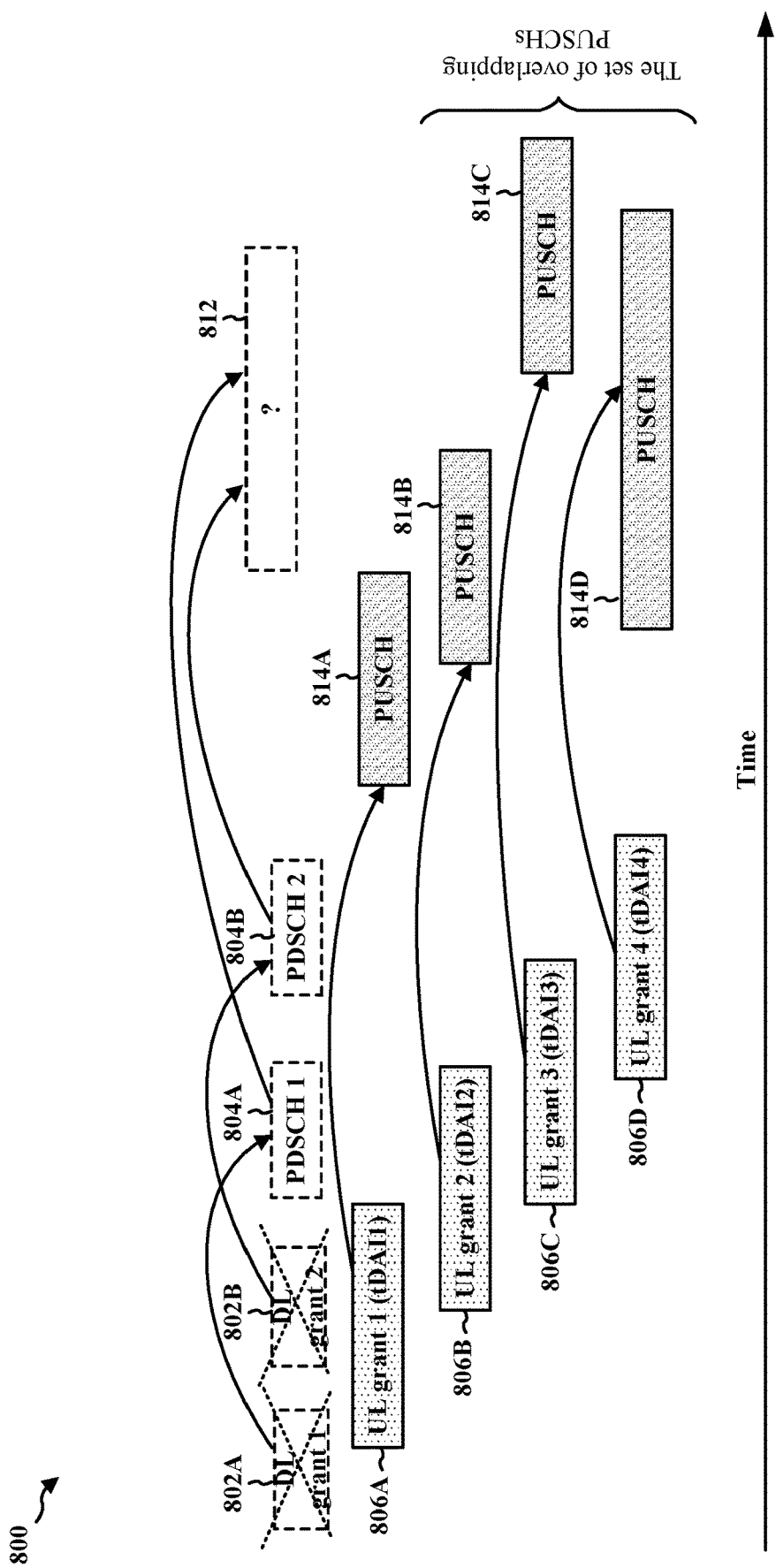
FIG. 8 is a diagram illustrating communications between a UE and a base station.

In another example, all DL grants may be missing and the UE 502 may not be able to determine the PUSCHs that are overlapping with a PUCCH. For instance, example 800 of FIG. 8 may include a first DL grant 802A, a second DL grant 802B, a first PDSCH 804A scheduled by the first DL grant 802A, a second PDSCH 804B scheduled by the second DL grant 802B, a first UL grant 806A associated with a first tDAI, a second UL grant 806B associated with a second tDAI, a third UL grant 806C associated with a third tDAI, a fourth UL grant 806D associated with a fourth tDAI, a first PUSCH 814A scheduled by the first UL grant 806A, a second PUSCH 814B scheduled by the second UL grant 806B, a third PUSCH 814C scheduled by the third UL grant 806C, a fourth PUSCH 814D scheduled by the third UL grant 806D, and a PUCCH 812 associated with the first PDSCH 804A and the second PDSCH 804B. As illustrated in FIG. 8, the first DL grant 802A and the second DL grant 802B may be missing, which may cause the first PDSCH 804A and the second PDSCH 804B to be not successfully scheduled for the UE 502. Based on the procedure illustrated in FIG. 6, the base station 504 may expect the UE 502 to multiplex the HARQ-ACK in the PUCCH 812 on one PUSCH, such as the second PUSCH 814B, and the number of bits in the HARQ-ACK to be based on a tDAI, such as the second tDAI. However, because neither the first PDSCH 804A nor the second PDSCH 804B was successfully scheduled for the UE 502, the UE 502 may not know when the PUCCH 812 starts or ends, and the set of PUSCHs that are overlapping with the PUCCH 812 may not be determined by the UE 502.

Figure 9:
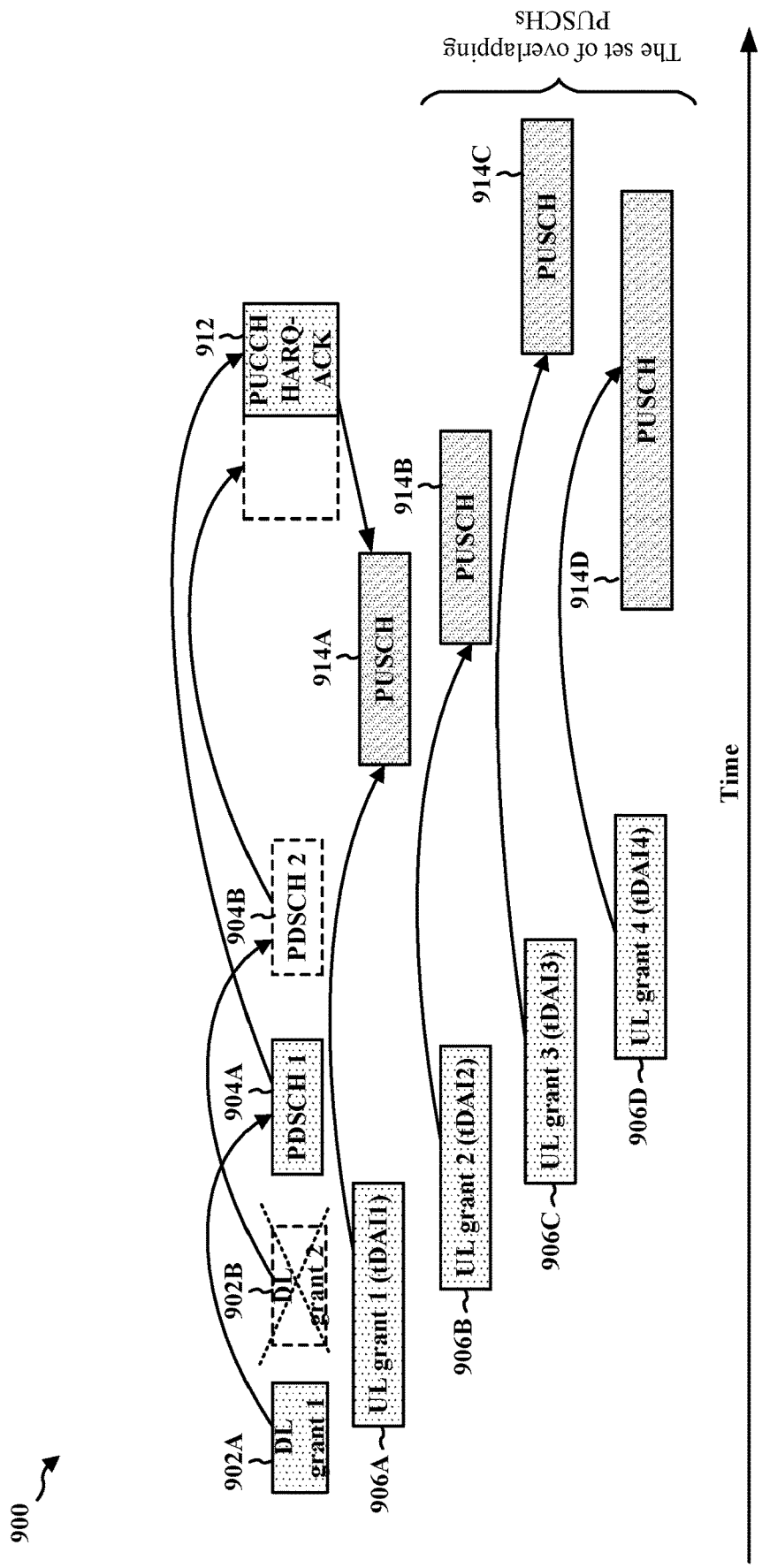
FIG. 9 is a diagram illustrating communications between a UE and a base station.

In some aspects, the UE 502 may not determine the set of overlapping PUSCHs based on whether the PUSCHs actually overlap with a PUCCH. Instead, all PUSCHs, regardless of actually overlapping with a PUCCH HARQ-ACK or not, may be included by the UE 502 in the set of overlapping PUSCHs, as long as its tDAI associated with the UL grant scheduling the PUSCH indicates a non-zero number of HARQ-ACK bits. In other words, the UE 502 may not determine whether a PUSCH overlaps with a PUCCH and then determine the UCI multiplexing, but the UE 502 may include all PUSCHs in the UCI multiplexing procedure as long as the UL grant scheduling the PUSCH is associated with a non-zero tDAI. For example, if a tDAI indicates zero HARQ-ACK bits are multiplexed on a first PUSCH, the first PUSCH may be excluded in the UCI multiplexing procedure. If a tDAI indicates a non-zero number of HARQ-ACK bits are multiplexed on a second PUSCH, the second PUSCH is included in the set of overlapping PUSCHs, regardless of whether it actually overlaps with the determined PUCCH HARQ-ACK. In other words, if a tDAI indicates a non-zero number of HARQ-ACK bits are multiplexed on a second PUSCH, the second PUSCH is included in the UCI multiplexing procedure. For instance, example 900 of FIG. 9 may include a first DL grant 902A, a second DL grant 902B, a first PDSCH 904A scheduled by the first DL grant 902A, a second PDSCH 904B scheduled by the second DL grant 902B, a first UL grant 906A associated with a first tDAI, a second UL grant 906B associated with a second tDAI, a third UL grant 906C associated with a third tDAI, a fourth UL grant 906D associated with a fourth tDAI, a first PUSCH 914A scheduled by the first UL grant 906A, a second PUSCH 914B scheduled by the second UL grant 906B, a third PUSCH 914C scheduled by the third UL grant 906C, a fourth PUSCH 914D scheduled by the fourth UL grant 906D, and a PUCCH 912 associated with the first PDSCH 904A and the second PDSCH 904B. As illustrated in FIG. 9, the second DL grant 902B may be missing (i.e., not successfully received by the UE 502), which may cause the second PDSCH 904B to be not successfully scheduled for the UE 502. In some aspects, the UE 502 may select the first PUSCH 914A as the host PUSCH and multiplex one or more HARQ-ACK bits on the first PUSCH 914A, the number of bits being based on the first tDAI in the first UL grant 906A scheduling the first PUSCH 914A. Even if the first DL grant 902A is also missing, which may cause the first PDSCH 904A and the second PDSCH 904B to be not successfully scheduled for the UE 502, the UE may nonetheless select the first PUSCH 914A as the host PUSCH and multiplex one or more HARQ-ACK bits on the first PUSCH 914A, the number of bits being based on the first tDAI in the first UL grant 906A scheduling the first PUSCH 914A.

Figure 10:
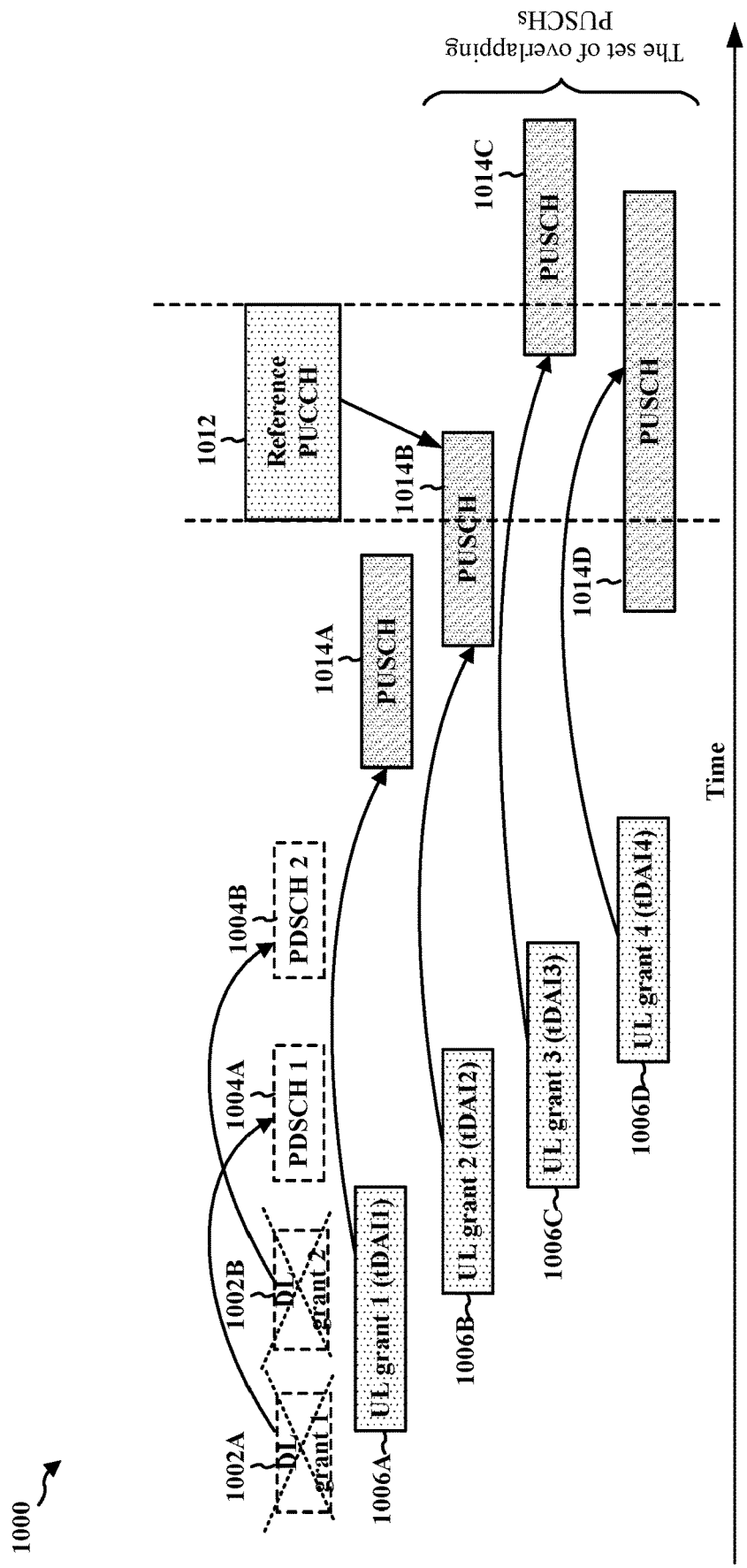
FIG. 10 is a diagram illustrating communications between a UE and a base station.

In some aspects, if all DL grants are missed, the UE 502 may use a reference PUCCH HARQ-ACK resource in a PUCCH resource set to determine the set of overlapping PUSCHs. In some aspects, the reference PUCCH HARQ-ACK resource may be the first resource or the resource with a longest duration in a PUCCH resource set. In some aspects, the reference PUCCH HARQ-ACK resource may be a PUCCH that spans an entire slot or subslot. For instance, example 1000 of FIG. 10 may include a first DL grant 1002A, a second DL grant 1002B, a first PDSCH 1004A scheduled by the first DL grant 1002A, a second PDSCH 1004B scheduled by the second DL grant 1002B, a first UL grant 1006A associated with a first tDAI, a second UL grant 1006B associated with a second tDAI, a third UL grant 1006C associated with a third tDAI, a fourth UL grant 1006D associated with a fourth tDAI, a first PUSCH 1014A scheduled by the first UL grant 1006A, a second PUSCH 1014B scheduled by the second UL grant 1006B, a third PUSCH 1014C scheduled by the third UL grant 1006C, a fourth PUSCH 1014D scheduled by the fourth UL grant 1006D, and a PUCCH 1012 associated with the first PDSCH 1004A and the second PDSCH 1004B. As illustrated in FIG. 10, the first DL grant 1002A and the second DL grant 1002B may be missing, which may cause the first PDSCH 1004A and the second PDSCH 1004B to be not successfully scheduled for the UE 502. Because neither the first PDSCH 1004A nor the second PDSCH 1004B was successfully scheduled for the UE 502, the UE 502 may not know when the PUCCH actually starts or ends. The UE 502 may then use a reference PUCCH 1012 to determine where the PUCCH starts and ends. Based on the reference PUCCH 1012, the UE 502 may determine that the second PUSCH 1014B, the third PUSCH 1014C, and the fourth PUSCH 1014D overlap with the reference PUCCH 1012. The UE 502 may multiplex HARQ-ACK bits on the second PUSCH 1014B, the number of bits being based on the second tDAI associated with the UL grant 1006B scheduling the second PUSCH 1014B. In some aspects, the reference PUCCH 1012 may be the first resource or the resource with a longest duration in a PUCCH resource set.

In some aspects, the UE 502 may multiplex HARQ-ACK bits in one slot and the UE 502 may receive exactly one UL grant associated with a non-zero tDAI representing multiplexing a non-zero number of HARQ bits (such as HARQ-ACK bits) on the PUSCH. The HARQ-ACK bits may be multiplexed on the PUSCH scheduled by the UL grant associated with a non-zero tDAI. In some aspects, UL grants in a same slot may be associated with a same (i.e., same value) tDAI. In some aspects, with a subslot based HARQ codebook (CB) the UE 502 may multiplex HARQ-ACK bits in one subslot and the UE 502 may receive exactly one UL grant associated with a non-zero tDAI. The HARQ-ACK bits may be multiplexed on the PUSCH scheduled by the UL grant associated with a non-zero tDAI. In some aspects, UL grants in a same subslot may be associated with a same (i.e., same value) tDAI.

In some aspects, the UE 502 may receive more than one UL grant that has a non-zero tDAI in one slot, and the UE 502 may multiplex PUCCH HARQ-ACK on the PUSCH that is scheduled by the UL grant associated with a tDAI that indicates a largest number of HARQ-ACK bits.

In some aspects, the UE 502 may receive more than one UL grant that has a non-zero tDAI in one slot, and the UE 502 may multiplex PUCCH HARQ-ACK on the PUSCH scheduled by the last received (i.e., last received in time) or the first received UL grant among the UL grants scheduling PUSCHs in the one slot. In some aspects, the UE 502 may choose to select a PUSCH in the one slot on which to multiplex the PUCCH HARQ-ACK.

In some aspects, the UE 502 may take the maximum of a tDAI and multiplex it on each PUSCH. In some aspects, the UE 502 may consider the mod 4 operation when taking the maximum of a tDAI. In some aspects, each PUSCH with a grant including tDAI may carry x bits of UCI, where tDAI is equal to x. For example, for slot-based HARQ CB or subslot based HARQ CB, each PUSCH with a grant including tDAI may carry x bits of UCI. The UE 502 may select between having one PUSCH per slot or subslot or having each PUSCH with a grant including tDAI may carry x bits of UCI, where tDAI is equal to x.

In some aspects, the UE 502 may consider the PUCCH configurations when selecting a PUSCH. For example, even if the UE 502 has missed the DL grants/DCIs, when the UE 502 selects a PUSCH on which to multiplex the HARQ bits, the selected PUSCH may correspond to a scheduling scenario that may have happened if the DL grants/DCIs are not missed. For example, if a UE selects a PUSCH on which to multiplex X bits, there may be a PUCCH resource configured and overlapping with the PUSCH that may carry x bits.

In some aspects, a timeline may be defined across PUSCHs scheduled in the same slot/subslot. In one non-limiting example, the grant scheduling a second PUSCH with a different tDAI from the first PUSCH may not be later than a defined time, such as N4, from the beginning or ending symbol of the first PUSCH. In some aspects, a defined time, such as N4, may be the latest time that PUSCHs with different tDAIs may be scheduled in a given slot/subslot and the reference may be from the starting symbol of the first PUSCH with tDAI. For example, the association between PUSCHs and subslots may be defined based on the starting symbol of each PUSCH. In some aspects, the timeline may be applied across PUSCHs scheduled by an UL grant indicating a non-zero tDAI. For example, the timeline may be applied across all PUSCH in a slot or subslot independent of a tDAI value associated with the PUSCH or independent of whether tDAI is configured in the UL grant scheduling the PUSCH.

In some aspects, if at least one PUSCH (e.g., at least one PUSCH of the PUSCHs 512) indicates that HARQ may be reported, but the UE 502 has not detected any PDSCH with HARQ report in the same slot as the PUSCH, then the UE 502 may choose one of the PUSCHs (such as one of the PUSCHs 512) to multiplex HARQ bits on. In some aspects, if at least one PUSCH (e.g., at least one PUSCH of the PUSCHs 512) indicates that HARQ may be reported, but the UE 502 has not detected any PDSCH with HARQ report in the same slot as the PUSCH, then the UE 502 may choose one of the PUSCHs with a tDAI value indicating HARQ reporting to multiplex HARQ bits on.

Figure 11:
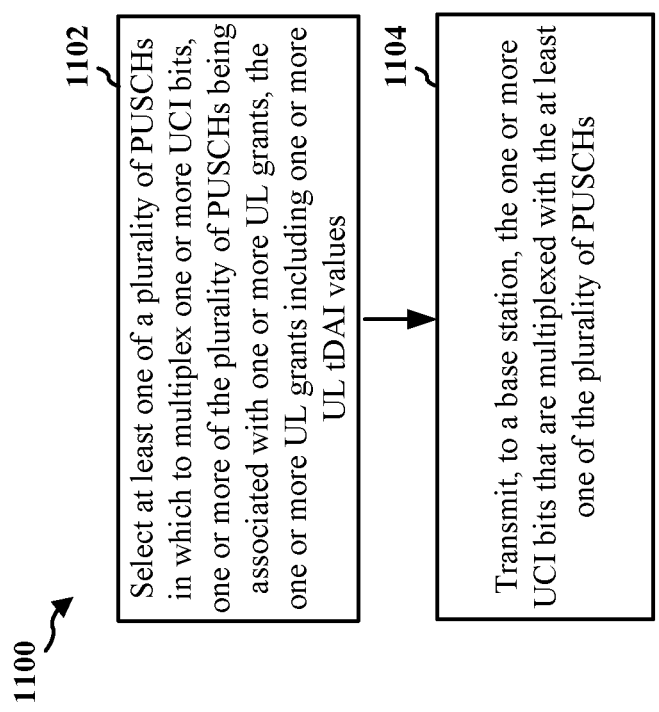
FIG. 11 is a flowchart of a method of wireless communication.

FIG. 11 is a flowchart 1100 of a method of wireless communication. The method may be performed by a UE (e.g., the UE 104, the UE 502; the apparatus 1402).

At 1102, the UE may select at least one of a plurality of PUSCHs in which to multiplex one or more UCI bits, one or more of the plurality of PUSCHs being associated with one or more UL grants, the one or more UL grants including one or more UL tDAI values. For example, the UE 502 may select at least one of a plurality of PUSCHs 512 in which to multiplex one or more UCI bits, each of the plurality of PUSCHs, such as the PUSCH 614A/B/C/D, the PUSCH 714A/B/C/D, the PUSCH 814A/B/C/D, the PUSCH 914A/B/C/D, or the PUSCH 1014A/B/C/D, being associated with an UL grant, such as the UL grant 606A/B/C/D, the UL grant 806A/B/C/D, the UL grant 806A/B/C/D, the UL grant 906A/B/C/D, or the UL grant 1006A/B/C/D, the one or more UL grants including one or more UL tDAI values. In some aspects, a subset of the PUSCHs may be respectively associated with a subset of UL grants that are each associated with a UL tDAI value. In some aspects, a subset of the one or more UL grants may be associated with one or more UL tDAI values and another subset of the one or more UL grants may not be associated with UL tDAI values. In some aspects, 1102 may be performed by the select component 1444 of FIG. 14.

At 1104, the UE may transmit, to a base station, the one or more UCI bits that are multiplexed with the at least one of the plurality of PUSCHs. For example, the UE 502 may transmit, to a base station 504, the one or more UCI bits that are multiplexed with the at least one of the plurality of PUSCHs, such as the PUSCH 614A/B/C/D, the PUSCH 714A/B/C/D, the PUSCH 814A/B/C/D, the PUSCH 914A/B/C/D, or the PUSCH 1014A/B/C/D. In some aspects, 1104 may be performed by the PUSCH component 198. The base station may be a network entity such as a network node.

Figure 12:
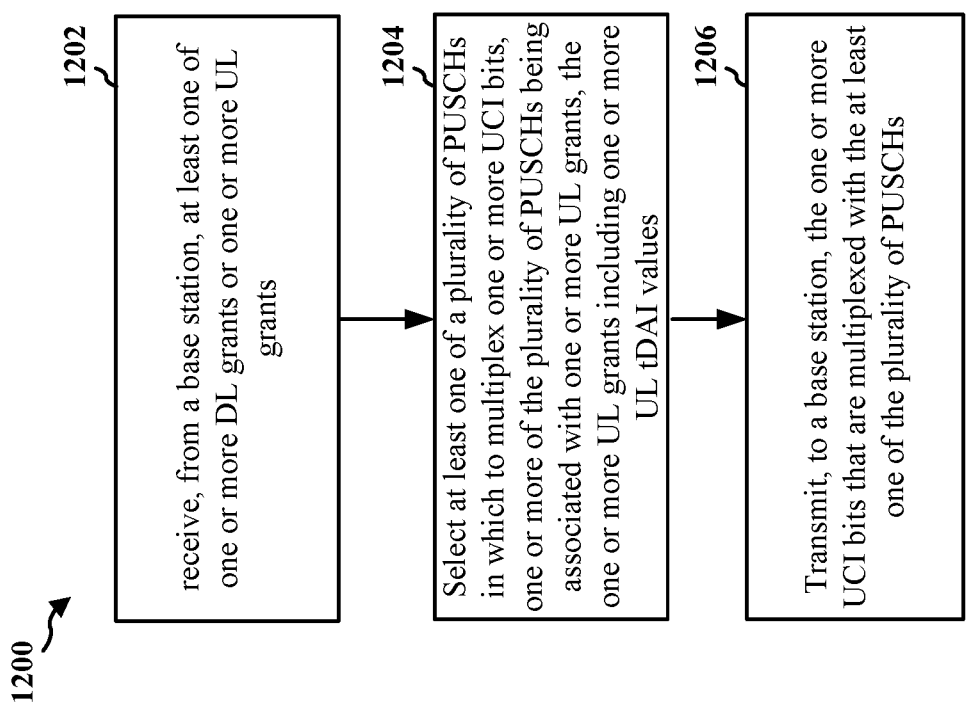
FIG. 12 is a flowchart of a method of wireless communication.

FIG. 12 is a flowchart 1200 of a method of wireless communication. The method may be performed by a UE (e.g., the UE 104, the UE 502; the apparatus 1402).

At 1202, the UE may receive, from a base station, at least one of one or more DL grants or one or more UL grants. For example, the UE 502 may receive, from a base station 504, at least one of one or more DL grants 506 or one or more UL grants 508. In some aspects, 1202 may be performed by the grant component 1442 of FIG. 14. The base station may be a network node.

At 1204, the UE may select at least one of a plurality of PUSCHs in which to multiplex one or more UCI bits, each of the plurality of PUSCHs may be associated with an UL grant, the one or more UL grants including one or more UL tDAI values. For example, the UE 502 may select at least one of a plurality of PUSCHs 512 in which to multiplex one or more UCI bits, each of the plurality of PUSCHs, such as the PUSCH 614A/B/C/D, the PUSCH 714A/B/C/D, the PUSCH 814A/B/C/D, the PUSCH 914A/B/C/D, or the PUSCH 1014A/B/C/D, being associated with an UL grant, such as the UL grant 606A/B/C/D, the UL grant 806A/B/C/D, the UL grant 806A/B/C/D, the UL grant 906A/B/C/D, the UL grant 1006A/B/C/D, the one or more UL grants including one or more UL tDAI values. In some aspects, 1204 may be performed by the select component 1444 of FIG. 14. In some aspects, at least one of the plurality of PUSCHs at least partially overlaps with a PUCCH. In some aspects, at least one of the plurality of PUSCHs may be associated with a non-zero UL tDAI value. In some aspects, the one or more UCI bits may be one or more HARQ-ACK bits. In some aspects, the one or more HARQ-ACK bits may correspond to a PUCCH, such as the PUCCH 514, the PUCCH 612, the PUCCH 712, the PUCCH 812, the PUCCH 912, or the PUCCH 1012. In some aspects, the at least one of the plurality of PUSCHs may be selected based on the UL tDAI value of an associated UL grant, such as the UL grant 506A/B/C/D, the UL grant 606A/B/C/D, the UL grant 806A/B/C/D, the UL grant 806A/B/C/D, the UL grant 906A/B/C/D, or the UL grant 1006A/B/C/D. In some aspects, the UE may detect at least one PUCCH based on at least one DL grant. In some aspects, the UE may select the at least one of the plurality of PUSCHs based on a non-zero UL tDAI value associated with the UL grant associated with each of the at least one selected PUSCHs. In some aspects, at least one of the plurality of PUSCHs may be excluded based on a zero UL tDAI value representing that no HARQ bits may be multiplexed on the PUSCH associated with the UL grant associated with each of the at least one excluded PUSCHs. For example, the zero UL tDAI value may represent that no HARQ bits may be multiplexed on the PUSCH scheduled by the UL grant associated with the zero UL tDAI value. In some aspects, the UL tDAI value may represent a number of HARQ-ACK bits. In some aspects, a subset of the PUSCHs may be respectively associated with a subset of UL grants that are each associated with a UL tDAI value. In some aspects, a subset of the one or more UL grants may be associated with one or more UL tDAI values and another subset of the one or more UL grants may not be associated with UL tDAI values. In some aspects, the UE may select the at least one of the plurality of PUSCHs in which to multiplex the one or more UCI bits based on not detecting a DL DCI with a HARQ in a same slot or a same subslot associated with the at least one of the plurality PUSCHs; and the UE may select one of (such as anyone of) the plurality of PUSCHs.

In some aspects, the UE may be scheduled to transmit a PUSCH in a slot or a subslot and the UE may not receive a DL grant associated with a transmission of HARQ-ACK in an associated slot or subslot. In some aspects, the UE may select the at least one of the plurality of PUSCHs in which to multiplex the one or more UCI bits based on a reference PUCCH HARQ-ACK resource in a PUCCH resource set. In some aspects, the reference PUCCH HARQ-ACK resource may be a first resource in the PUCCH resource set. In some aspects, the reference PUCCH HARQ-ACK resource may include a longest duration resource in the PUCCH resource set. In some aspects, the reference PUCCH HARQ-ACK resource may be a PUCCH that spans an entire slot or subslot. In some aspects, the UE may receive one UL grant associated with a non-zero tDAI value in one slot without receiving additional UL grants in the one slot. In some aspects, the UE may be configured with a subslot-based HARQ codebook and the UE may receive one UL grant associated with a non-zero tDAI value in one subslot without receiving additional UL grants in the one subslot, a PUSCH associated with the UL grant being associated with the one subslot based on a starting symbol of the PUSCH. In some aspects, one or more UL grants received in a same slot may be associated with a same tDAI value. In some aspects, the UE may be configured with a subslot-based HARQ codebook, and one or more UL grants received in a same subslot may be associated with a same tDAI value. In some aspects, the UE may select the at least one of the plurality of PUSCHs in which to multiplex the one or more UCI bits based on a maximum number associated with the UL tDAI value. In some aspects, the UE may select the at least one of the plurality of PUSCHs in which to multiplex the one or more UCI bits based on a last received UL grant associated with the at least one of the plurality of PUSCHs. In some aspects, the UE may select the at least one of the plurality of PUSCHs in which to multiplex the one or more UCI bits based on a first received UL grant associated with the at least one of the plurality of PUSCHs. In some aspects, the UE may multiplex a maximum of the tDAI value on each PUSCH of the plurality of PUSCHs. In some aspects, each PUSCH of the plurality of PUSCHs may carry X bits of UCI, X may be equal to the associated tDAI value. In some aspects, the UE may select the at least one of the plurality of PUSCHs in which to multiplex the one or more UCI bits based at least in part on a PUCCH configuration representing a maximum number of bits that a PUCCH resource may be capable of carrying. In some aspects, the UE may select the at least one of the plurality of PUSCHs in which to multiplex the one or more UCI bits based on a defined timeline within a slot or a subslot.

At 1206, the UE may transmit, to a base station, the one or more UCI bits that are multiplexed with the at least one of the plurality of PUSCHs. For example, the UE 502 may transmit, to a base station 504, the one or more UCI bits that are multiplexed with the at least one of the plurality of PUSCHs, such as the PUSCH 614A/B/C/D, the PUSCH 714A/B/C/D, the PUSCH 814A/B/C/D, the PUSCH 914A/B/C/D, or the PUSCH 1014A/B/C/D. In some aspects, 1206 may be performed by the PUSCH component 1446 of FIG. 14. The base station may be a network entity such as a network node.

Figure 13:
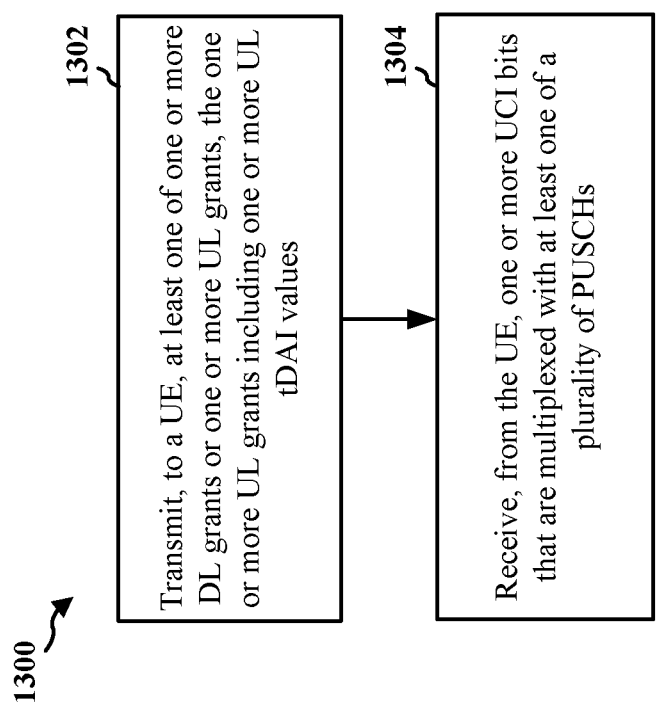
FIG. 13 is a flowchart of a method of wireless communication.

FIG. 13 is a flowchart 1300 of a method of wireless communication. The method may be performed by a base station (e.g., the base station 102/180, the base station 504; the apparatus 1502). The base station may be a network entity such as a network node.

At 1302, the base station may transmit, to a UE, at least one of one or more DL grants or one or more UL grants, the one or more UL grants including one or more UL tDAI values. For example, the base station 504 may transmit, to a UE 502, at least one of one or more DL grants 506 or one or more UL grants 508, the one or more UL grants including one or more UL tDAI values. In some aspects, 1302 may be performed by the grant component 1542 of FIG. 15. In some aspects, one or more UL grants transmitted in a same slot may be associated with a same tDAI value. In some aspects, the base station may be configured with a subslot-based HARQ codebook and the base station may transmit one UL grant associated with a non-zero tDAI value in one subslot without receiving additional UL grants in the one subslot. In some aspects, a PUSCH associated with the UL grant may be associated with the one subslot based on a starting symbol of the PUSCH. In some aspects, one or more UL grants transmitted in a same slot may be associated with a same tDAI value. In some aspects, the base station may be configured with a subslot-based HARQ codebook and one or more UL grants transmitted in a same subslot may be associated with a same tDAI value. In some aspects, a subset of UL grants may be each associated with a UL tDAI value. In some aspects, a subset of the one or more UL grants may be associated with one or more UL tDAI values and another subset of the one or more UL grants may not be associated with UL tDAI values.

At 1304, the base station may receive, from the UE, one or more UCI bits that are multiplexed with at least one of a plurality of PUSCHs. For example, the base station 504 may receive, from the UE 502, one or more UCI bits that are multiplexed with at least one of a plurality of PUSCHs, such as the PUSCH 614A/B/C/D, the PUSCH 714A/B/C/D, the PUSCH 814A/B/C/D, the PUSCH 914A/B/C/D, or the PUSCH 1014A/B/C/D. In some aspects, 1304 may be performed by the PUSCH component 1544 of FIG. 15. In some aspects, at least one of the plurality of PUSCHs may at least partially overlap with a PUCCH. In some aspects, at least one of the plurality of PUSCHs may be associated with a non-zero UL tDAI value. In some aspects, the one or more UCI bits may be one or more HARQ-ACK bits. In some aspects, the one or more HARQ-ACK bits may correspond to a PUCCH. In some aspects, the UL tDAI value may represent a number of HARQ-ACK bits. In some aspects, each PUSCH of the plurality of PUSCHs may carry X bits of UCI, X may be equal to an associated tDAI value.

Figure 14:
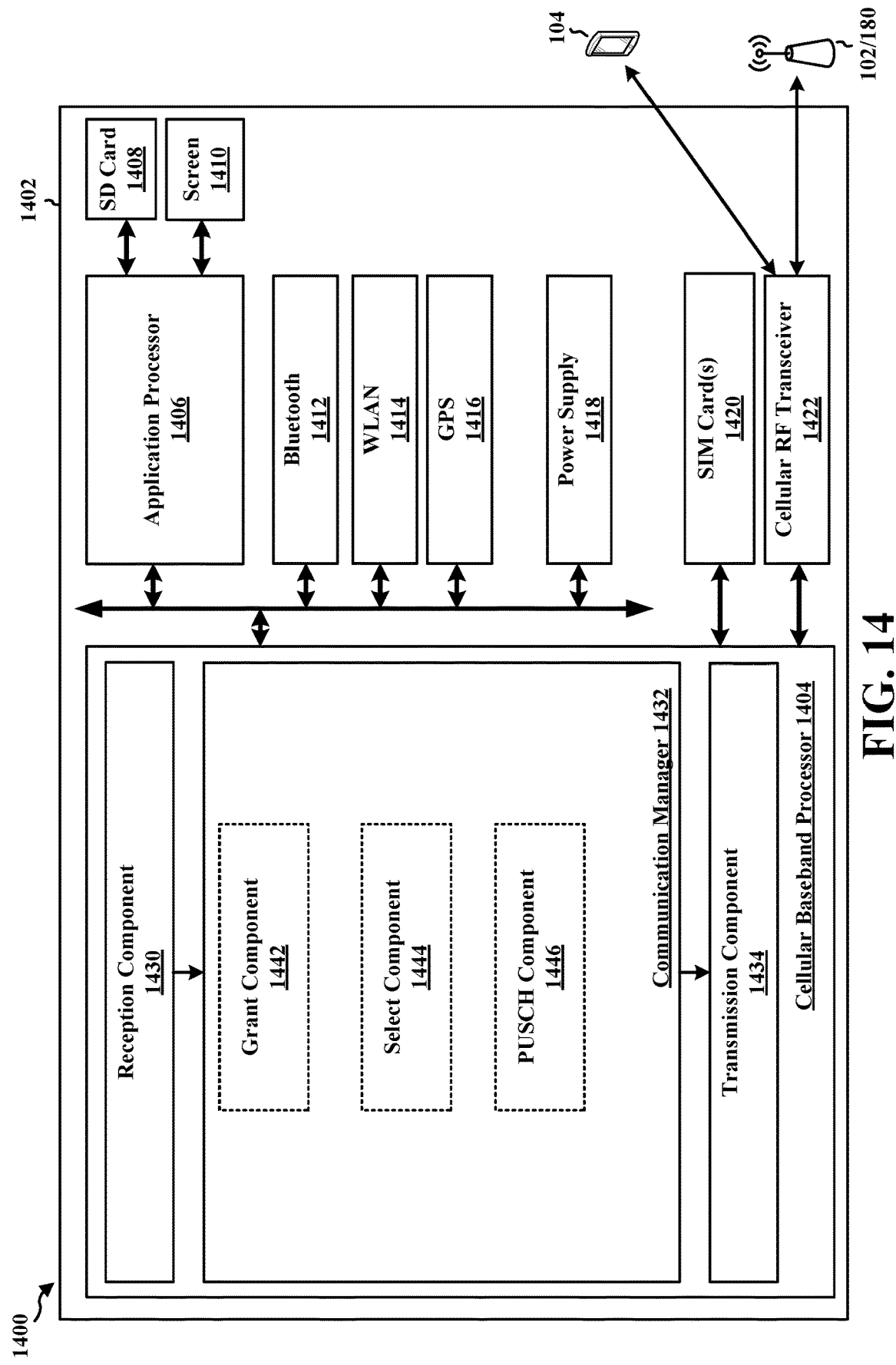
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 may include a grant component 1442 that is configured to receive, from a network entity, at least one of one or more DL grants or one or more UL grants, e.g., as described in connection with 1202 in FIG. 12. The communication manager 1432 may further include a select component 1444 that may be configured to select at least one of a plurality of PUSCHs in which to multiplex one or more UCI bits, one or more of the plurality of PUSCHs being associated with one or more UL grants, the one or more UL grants including one or more UL tDAI values, e.g., as described in connection with 1102 in FIG. 11 and 1204 in FIG. 12. The communication manager 1432 may further include a PUSCH component 1446 that may be configured to transmit, to a base station, the one or more UCI bits that are multiplexed with the at least one of the plurality of PUSCHs, e.g., as described in connection with 1104 in FIGS. 11 and 1206 in FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, may include means for selecting at least one of a plurality of PUSCHs in which to multiplex one or more UCI bits, one or more of the plurality of PUSCHs being associated with one or more UL grants, the one or more UL grants including one or more UL tDAI values. The cellular base band processor 1404 may further include means for transmitting, to a network entity, the one or more UCI bits that are multiplexed with the at least one of the plurality of PUSCHs. The cellular base band processor 1404 may further include means for receiving, from a base station, at least one of one or more DL grants or one or more UL grants. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
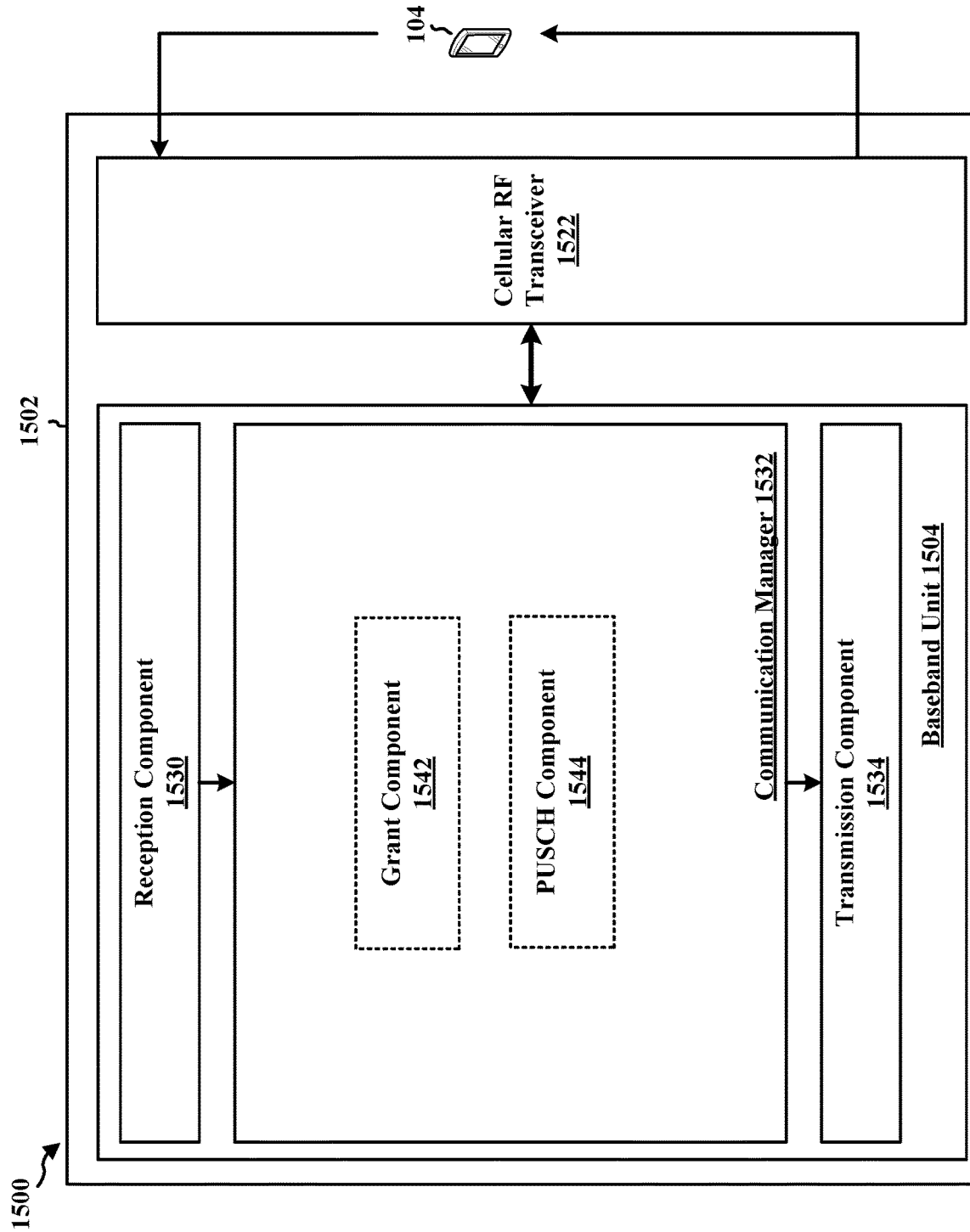
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1402 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 may include a grant component 1542 that may transmit, to a UE, at least one of one or more DL grants or one or more UL grants, the one or more UL grants including one or more UL tDAI values, e.g., as described in connection with 1302 in FIG. 13. The communication manager 1532 further may include a PUSCH component 1544 that may receive, from the UE, one or more UCI bits that are multiplexed with at least one of a plurality of PUSCHs, e.g., as described in connection with 1304 in FIG. 13.

The apparatus may include additional components that perform each of the blocks of the algorithm in the flowchart of FIG. 13. As such, each block in the flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, may include means for selecting at least one of a plurality of PUSCHs in which to multiplex one or more UCI bits, one or more of the plurality of PUSCHs being associated with one or more UL grants, the one or more UL grants including one or more UL tDAI values. The baseband unit 1504 may further include means for transmitting, to a base station, the one or more UCI bits that are multiplexed with the at least one of the plurality of PUSCHs. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, including: a memory; and at least one processor coupled to the memory and configured to: select at least one of a plurality of PUSCHs in which to multiplex one or more UCI bits, one or more of the plurality of PUSCHs being associated with one or more UL grants, the one or more UL grants including one or more UL tDAI values; and transmit, to a network entity, the one or more UCI bits that are multiplexed with the at least one of the plurality of PUSCHs.

Aspect 2 is the apparatus of aspect 1, where at least one of the plurality of PUSCHs at least partially overlaps with a PUCCH.

Aspect 3 is the apparatus of any of aspects 1-2, where at least one of the plurality of PUSCHs is associated with a non-zero UL tDAI value representing multiplexing a non-zero number of HARQ bits on the PUSCH.

Aspect 4 is the apparatus of any of aspects 1-3, where the at least one processor coupled to the memory is further configured to: receive, from the network entity, at least one of one or more DL grants or one or more UL grants.

Aspect 5 is the apparatus of any of aspects 1-4, where the one or more UCI bits are one or more HARQ-ACK bits.

Aspect 6 is the apparatus of any of aspects 1-5, where the one or more HARQ-ACK bits correspond to a PUCCH.

Aspect 7 is the apparatus of any of aspects 1-6, where the at least one of the plurality of PUSCHs is selected based on the UL tDAI value of an associated UL grant.

Aspect 8 is the apparatus of any of aspects 1-7, where the UE detects at least one PUCCH based on at least one DL grant, and where the at least one processor coupled to the memory is further configured to: select the at least one of the plurality of PUSCHs based on a non-zero UL tDAI value associated with the UL grant associated with each of the at least one selected PUSCHs.

Aspect 9 is the apparatus of any of aspects 1-8, where at least one of the plurality of PUSCHs is excluded based on a zero UL tDAI value representing no HARQ bits to be multiplexed on the PUSCH associated with the UL grant associated with each of the at least one excluded PUSCHs.

Aspect 10 is the apparatus of any of aspects 1-9, where the UL tDAI value represents a number of HARQ-ACK bits.

Aspect 11 is the apparatus of any of aspects 1-10, where the UE is scheduled to transmit a PUSCH in a slot or subslot, where the UE does not receive a DL grant associated with a transmission of HARQ-ACK in an associated slot or subslot, and where at least one processor coupled to the memory is further configured to select the at least one of the plurality of PUSCHs in which to multiplex the one or more UCI bits based on a reference PUCCH HARQ-ACK resource in a PUCCH resource set.

Aspect 12 is the apparatus of any of aspects 11, where the reference PUCCH HARQ-ACK resource is a first resource in the PUCCH resource set.

Aspect 13 is the apparatus of any of aspects 1-12, where the reference PUCCH HARQ-ACK resource includes a longest duration of resources in the PUCCH resource set.

Aspect 14 is the apparatus of any of aspects 1-13, where the reference PUCCH HARQ-ACK resource is a PUCCH that spans an entire slot or subslot.

Aspect 15 is the apparatus of any of aspects 1-14, where the UE receives one UL grant associated with a non-zero tDAI value in one slot without receiving additional UL grants in the one slot.

Aspect 16 is the apparatus of any of aspects 1-15, where the UE is configured with a subslot-based HARQ codebook, and where the UE receives one UL grant associated with a non-zero tDAI value in one subslot without receiving additional UL grants in the one subslot, a PUSCH associated with the UL grant being associated with the one subslot based on a starting symbol of the PUSCH.

Aspect 17 is the apparatus of any of aspects 1-16, where one or more UL grants received in a same slot are associated with a same tDAI value.

Aspect 18 is the apparatus of any of aspects 1-17, where the UE is configured with a subslot-based HARQ codebook, and where one or more UL grants received in a same subslot are associated with a same tDAI value.

Aspect 19 is the apparatus of any of aspects 1-18, where the at least one processor coupled to the memory is further configured to select the at least one of the plurality of PUSCHs in which to multiplex the one or more UCI bits based on a maximum number associated with the UL tDAI value.

Aspect 20 is the apparatus of any of aspects 1-19, where the at least one processor coupled to the memory is further configured to select the at least one of the plurality of PUSCHs in which to multiplex the one or more UCI bits based on a last received UL grant associated with the at least one of the plurality of PUSCHs.

Aspect 21 is the apparatus of any of aspects 1-20, where the at least one processor coupled to the memory is further configured to select the at least one of the plurality of PUSCHs in which to multiplex the one or more UCI bits based on not detecting a DL DCI with a HARQ in a same slot or a same subslot associated with the at least one of the plurality PUSCHs.

Aspect 22 is the apparatus of any of aspects 1-21, where the at least one processor coupled to the memory is further configured to select the at least one of the plurality of PUSCHs in which to multiplex the one or more UCI bits based on a first received UL grant associated with the at least one of the plurality of PUSCHs.

Aspect 23 is the apparatus of any of aspects 1-22, where the at least one processor coupled to the memory is further configured to: multiplex a maximum of the tDAI value on each PUSCH of the plurality of PUSCHs.

Aspect 24 is the apparatus of any of aspects 1-23, where each PUSCH of the plurality of PUSCHs carries X bits of UCI, X being equal to the associated tDAI value.

Aspect 25 is the apparatus of any of aspects 1-24, where the at least one processor coupled to the memory is further configured to select the at least one of the plurality of PUSCHs in which to multiplex the one or more UCI bits based at least in part on a PUCCH configuration representing a maximum number of bits that a PUCCH resource is capable of carrying.

Aspect 26 is the apparatus of any of aspects 1-25, where the at least one processor coupled to the memory is further configured to select the at least one of the plurality of PUSCHs in which to multiplex the one or more UCI bits based on a defined timeline within a slot or a subslot.

Aspect 27 is the apparatus of any of aspects 1-26, further including a transceiver coupled to the at least one processor.

Aspect 28 is an apparatus for wireless communication at a network entity, including: a memory; and at least one processor coupled to the memory and configured to: transmit, for a UE, at least one of one or more DL grants or one or more UL grants, the one or more UL grants including one or more UL tDAI values; and receive, one or more UCI bits that are multiplexed with at least one of a plurality of PUSCHs.

Aspect 29 is the apparatus of aspect 28, where at least one of the plurality of PUSCHs at least partially overlaps with a PUCCH.

Aspect 30 is the apparatus of any of aspects 28-29, where at least one of the plurality of PUSCHs is associated with a non-zero UL tDAI value.

Aspect 31 is the apparatus of any of aspects 28-30, where the one or more UCI bits are one or more HARQ-ACK bits.

Aspect 32 is the apparatus of any of aspects 28-31, where the one or more HARQ-ACK bits correspond to a PUCCH.

Aspect 33 is the apparatus of any of aspects 28-32, where the UL tDAI value represents a number of HARQ-ACK bits.

Aspect 34 is the apparatus of any of aspects 28-33, where one or more UL grants transmitted in a same slot are associated with a same tDAI value.

Aspect 35 is the apparatus of any of aspects 28-34, where the network entity is configured with a subslot-based HARQ codebook, and where the network entity transmits one UL grant associated with a non-zero tDAI value in one subslot without receiving additional UL grants in the one subslot, a PUSCH associated with the UL grant being associated with the one subslot based on a starting symbol of the PUSCH.

Aspect 36 is the apparatus of any of aspects 28-35, where one or more UL grants transmitted in a same slot are associated with a same tDAI value.

Aspect 37 is the apparatus of any of aspects 28-36, where the network entity is configured with a subslot-based HARQ codebook, and where one or more UL grants transmitted in a same subslot are associated with a same tDAI value.

Aspect 38 is the apparatus of any of aspects 28-37, where each PUSCH of the plurality of PUSCHs carries X bits of UCI, X being equal to an associated tDAI value.

Aspect 39 is the apparatus of any of aspects 28-38, further including a transceiver coupled to the at least one processor.

Aspect 40 is a method of wireless communication at a UE, including: selecting at least one of a plurality of PUSCHs in which to multiplex one or more UCI bits, one or more of the plurality of PUSCHs being associated with one or more UL grants, the one or more UL grants including one or more UL tDAI values; and transmitting, to a network entity, the one or more UCI bits that are multiplexed with the at least one of the plurality of PUSCHs.

Aspect 41 is the method of aspect 40, further including method for implementing any of aspects 2-27.

Aspect 42 is an apparatus for wireless communication at a UE, including: means for selecting at least one of a plurality of PUSCHs in which to multiplex one or more UCI bits, one or more of the plurality of PUSCHs being associated with one or more UL grants, the one or more UL grants including one or more UL tDAI values; and means for transmitting, to a network entity, the one or more UCI bits that are multiplexed with the at least one of the plurality of PUSCHs.

Aspect 43 is the apparatus of aspect 42, further including a transceiver.

Aspect 44 is the apparatus for wireless communication of any of aspects 42-43, further including means for implementing any of aspects 2-27.

Aspect 45 is a computer-readable medium storing computer executable code at a UE, the code when executed by a processor causes the processor to: select at least one of a plurality of PUSCHs in which to multiplex one or more UCI bits, one or more of the plurality of PUSCHs being associated with one or more UL grants, the one or more UL grants including one or more UL tDAI values; and transmit, to a network entity, the one or more UCI bits that are multiplexed with the at least one of the plurality of PUSCHs.

Aspect 46 is the computer-readable medium of aspect 45, where the code when executed by the processor causes the processor to implement any of aspects 2-27.

Aspect 47 is a method of wireless communication at a network entity, including: transmitting, for a UE, at least one of one or more DL grants or one or more UL grants, the one or more UL grants including one or more UL tDAI values; and receiving, one or more UCI bits that are multiplexed with at least one of a plurality of PUSCHs.

Aspect 48 is the method of aspect 47, further including method for implementing any of aspects 29-39.

Aspect 49 is an apparatus for wireless communication at a network entity, including: means for transmitting, for a UE, at least one of one or more DL grants or one or more UL grants, the one or more UL grants including one or more UL tDAI values; and means for receiving, one or more UCI bits that are multiplexed with at least one of a plurality of PUSCHs.

Aspect 50 is the apparatus of aspect 49, further including a transceiver.

Aspect 51 is the apparatus for wireless communication of any of aspects 49-50, further including means for implementing any of aspects 29-39.

Aspect 52 is a computer-readable medium storing computer executable code at a network entity, the code when executed by a processor causes the processor to: transmit, for a UE, at least one of one or more DL grants or one or more UL grants, the one or more UL grants including one or more UL tDAI values; and receive, one or more UCI bits that are multiplexed with at least one of a plurality of PUSCHs.

Aspect 53 is the computer-readable medium of aspect 52, where the code when executed by the processor causes the processor to implement any of aspects 29-39.

What is claimed is:

1. An apparatus for wireless communication at a user equipment (UE), comprising:
  memory; and
  at least one processor coupled to the memory and configured to:
    select at least one of a plurality of physical uplink shared channels (PUSCHs) in which to multiplex one or more uplink control information (UCI) bits, one or more of the plurality of PUSCHs being respectively granted by one or more uplink (UL) grants, the one or more UL grants including one or more UL total downlink assignment index (tDAI) values, wherein the selection is based on a non-zero UL tDAI value associated with the UL grant associated with each of the at least one selected PUSCHs;
    exclude a set of PUSCHs being granted by a set of UL grants associated with a zero UL tDAI value from the selection; and
    transmit, to a network entity, the one or more UCI bits that are multiplexed with the at least one of the plurality of PUSCHs.

2. The apparatus of claim 1, wherein at least one of the plurality of PUSCHs at least partially overlaps with a physical uplink control channel (PUCCH).

3. The apparatus of claim 1, wherein at least one of the plurality of PUSCHs is associated with a non-zero UL tDAI value representing multiplexing a non-zero number of hybrid automatic repeat request (HARQ) bits on the PUSCH.

4. The apparatus of claim 1, wherein the at least one processor is further configured to:
  receive, from the network entity, at least one of one or more downlink (DL) grants or one or more UL grants.

5. The apparatus of claim 1, wherein the one or more UCI bits are one or more hybrid automatic repeat request (HARQ) acknowledgment (ACK) (HARQ-ACK) bits.

6. The apparatus of claim 5, wherein the one or more HARQ-ACK bits correspond to a physical uplink control channel (PUCCH).

7. The apparatus of claim 1, wherein to select the at least one of the plurality of PUSCHs, the at least one processor is configured to select the at least one of the plurality of PUSCHs is selected based on the UL tDAI value of an associated UL grant.

8. The apparatus of claim 1, wherein the at least one processor is configured to transmit at least one physical uplink control channel (PUCCH) based on at least one DL grant.

9. The apparatus of claim 8, wherein at least one of the plurality of PUSCHs is excluded based on a zero UL tDAI value representing no hybrid automatic repeat request (HARQ) bits to be multiplexed on the PUSCH associated with the UL grant associated with each of the at least one excluded PUSCHs.

10. The apparatus of claim 8, wherein the UL tDAI value represents a number of hybrid automatic repeat request (HARQ) acknowledgment (ACK) (HARQ-ACK) bits.

11. The apparatus of claim 1, wherein the UE is scheduled to transmit a PUSCH in a slot or subslot, wherein the UE does not receive a DL grant associated with a transmission of hybrid automatic repeat request (HARQ) acknowledgment (ACK) (HARQ-ACK) in an associated slot or subslot, and wherein the at least one processor is further configured to select the at least one of the plurality of PUSCHs in which to multiplex the one or more UCI bits based on a reference physical uplink control channel (PUCCH) HARQ-ACK resource in a PUCCH resource set.

12. The apparatus of claim 11, wherein the reference PUCCH HARQ-ACK resource is a first resource in the PUCCH resource set.

13. The apparatus of claim 11, wherein the reference PUCCH HARQ-ACK resource includes a longest duration of resources in the PUCCH resource set.

14. The apparatus of claim 11, wherein the reference PUCCH HARQ-ACK resource is a PUCCH that spans an entire slot or subslot.

15. The apparatus of claim 1, wherein the UE receives one UL grant associated with a non-zero tDAI value in one slot without receiving additional UL grants in the one slot.

16. The apparatus of claim 1, wherein the UE is configured with a subslot-based hybrid automatic repeat request (HARQ) codebook, and wherein the UE receives one UL grant associated with a non-zero tDAI value in one subslot without receiving additional UL grants in the one subslot, a PUSCH associated with the UL grant being associated with the one subslot based on a starting symbol of the PUSCH.

17. The apparatus of claim 1, wherein one or more UL grants in a same slot are associated with a same tDAI value.

18. The apparatus of claim 1, wherein the UE is configured with a subslot-based hybrid automatic repeat request (HARQ) codebook, and wherein one or more UL grants in a same subslot are associated with a same tDAI value.

19. The apparatus of claim 1, wherein the at least one processor is further configured to select the at least one of the plurality of PUSCHs in which to multiplex the one or more UCI bits based on a maximum number associated with the UL tDAI value.

20. The apparatus of claim 1, wherein the at least one processor is further configured to select the at least one of the plurality of PUSCHs in which to multiplex the one or more UCI bits based on a last received UL grant associated with the at least one of the plurality of PUSCHs.

21. The apparatus of claim 1, wherein the at least one processor is further configured to select the at least one of the plurality of PUSCHs in which to multiplex the one or more UCI bits based on not detecting a downlink (DL) downlink control information (DCI) with a hybrid automatic repeat request (HARQ) in a same slot or a same subslot associated with the at least one of the plurality PUSCHs.

22. The apparatus of claim 1, wherein the at least one processor is further configured to select the at least one of the plurality of PUSCHs in which to multiplex the one or more UCI bits based on a first received UL grant associated with the at least one of the plurality of PUSCHs.

23. The apparatus of claim 1, wherein the at least one processor is further configured to: multiplex a maximum of the tDAI value on each PUSCH of the plurality of PUSCHs.

24. The apparatus of claim 1, wherein each PUSCH of the plurality of PUSCHs carries X bits of UCI, X being equal to the associated tDAI value.

25. The apparatus of claim 1, wherein the at least one processor is further configured to select the at least one of the plurality of PUSCHs in which to multiplex the one or more UCI bits based at least in part on a physical uplink control channel (PUCCH) configuration representing a maximum number of bits that a PUCCH resource is capable of carrying.

26. The apparatus of claim 1, wherein the at least one processor is further configured to select the at least one of the plurality of PUSCHs in which to multiplex the one or more UCI bits based on a defined timeline within a slot or a subslot.

27. The apparatus of claim 1, further comprising a transceiver coupled to the at least one processor.

28. An apparatus for wireless communication at a network entity, comprising:
  memory; and
  at least one processor coupled to the memory and configured to:
    transmit, for a user equipment (UE), at least one of one or more downlink (DL) grants or one or more uplink (UL) grants, the one or more UL grants including one or more UL total downlink assignment index (tDAI) values; and
    receive one or more uplink control information (UCI) bits that are multiplexed with at least one of a plurality of physical uplink shared channels (PUSCHs), wherein each of the at least one PUSCHs is associated with a non-zero UL tDAI value associated with a respective UL grant, and wherein none of the at least one PUSCHs is associated with a zero UL tDAI value.

29. A method of wireless communication at a user equipment (UE), comprising:
  selecting at least one of a plurality of physical uplink shared channels (PUSCHs) in which to multiplex one or more uplink control information (UCI) bits, one or more of the plurality of PUSCHs being respectively granted by one or more uplink (UL) grants, the one or more UL grants including one or more UL total downlink assignment index (tDAI) values, wherein the selection is based on a non-zero UL tDAI value associated with the UL grant associated with each of the at least one selected PUSCHs;
  excluding a set of PUSCHs being granted by a set of UL grants associated with a zero UL tDAI value from the selection; and
  transmitting, to a network entity, the one or more UCI bits that are multiplexed with the at least one of the plurality of PUSCHs.

30. A method of wireless communication at a network entity, comprising:
  transmitting, for a user equipment (UE), at least one of one or more downlink (DL) grants or one or more uplink (UL) grants, the one or more UL grants including one or more UL total downlink assignment index (tDAI) values; and
  receiving one or more uplink control information (UCI) bits that are multiplexed with at least one of a plurality of physical uplink shared channels (PUSCHs), wherein each of the at least one PUSCHs is associated with a non-zero UL tDAI value associated with a respective UL grant, and wherein none of the at least one PUSCHs is associated with a zero UL tDAI value.

\* \* \* \* \*